US012602279B2

(12) United States Patent
Miller et al.

(10) Patent No.: US 12,602,279 B2
(45) Date of Patent: Apr. 14, 2026

(54) SYSTEMS AND METHODS FOR DEBUGGING MULTI-CORE PROCESSORS WITH CONFIGURABLE ISOLATED PARTITIONS

(71) Applicant: NXP USA, Inc., Austin, TX (US)

(72) Inventors: Gary L. Miller, Austin, TX (US); Devendra Bahadur Singh, Lucknow (IN); Jonathan Gamoneda, Austin, TX (US); Paul Kimelman, Alamo, CA (US); Oded Yishay, Austin, TX (US)

(73) Assignee: NXP USA, INC., Austin, TX (US)

( * ) Notice: Subject to any disclaimer, the term of this patent is extended or adjusted under 35 U.S.C. 154(b) by 91 days.

(21) Appl. No.: 18/455,663

(22) Filed: Aug. 25, 2023

(65) Prior Publication Data

US 2024/0272978 A1    Aug. 15, 2024

(30) Foreign Application Priority Data

Feb. 13, 2023    (IN) .............................. 202311009355

(51) Int. Cl.
*G06F 11/22* (2006.01)
*G06F 11/07* (2006.01)

(52) U.S. Cl.
CPC ...... *G06F 11/0793* (2013.01); *G06F 11/0721* (2013.01); *G06F 11/2236* (2013.01); *G06F 11/2242* (2013.01)

(58) Field of Classification Search
CPC ............. G06F 11/2236; G06F 11/2242; G06F 11/2736
See application file for complete search history.

(56) References Cited

U.S. PATENT DOCUMENTS

| | | | |
|---|---|---|---|
| 7,743,375 B2 | 6/2010 | Goodman et al. | |
| 8,738,860 B1 * | 5/2014 | Griffin ................ | G06F 12/0897 |
| | | | 711/122 |
| 9,665,466 B2 | 5/2017 | Brites et al. | |
| 10,635,622 B2 * | 4/2020 | Bilski ................. | G06F 13/4022 |
| 10,949,352 B1 | 3/2021 | Kimelman | |

(Continued)

OTHER PUBLICATIONS

Cilku et al. "A dual-layer bus arbiter for mixed-criticality systems with hypervisors". IEEE Xplore. Jul. 2014. (Year: 2014).*

(Continued)

*Primary Examiner* — Yolanda L Wilson

(57) ABSTRACT

Systems and methods for debugging multi-core processors with configurable isolated partitions have been described. In an illustrative, non-limiting embodiment, an integrated circuit, may include: a plurality of Cross-Trigger Matrices (CTMs) configured to establish a debug network among a plurality of multi-cluster tiles (MCTs), where each MCT includes a plurality of processor cores, and where each processor core is assigned to a respective isolated partition of processor cores; and a System Interface (SI) coupled to the plurality of CTMs, where the SI is configured to control the plurality of CTMs to enable or disable at least a portion of the debug network to allow an isolated partition to be debugged independently of another isolated partition. A method may include enabling or disabling, by the SI, buses between the MCTs to create isolated debug networks, each isolated debug network corresponding to a distinct isolated partition of processor cores.

19 Claims, 10 Drawing Sheets

(56)          References Cited

U.S. PATENT DOCUMENTS

| | | | |
|---|---|---|---|
| 11,119,922 B1 | 9/2021 | Kimelman et al. | |
| 11,488,935 B1 | 11/2022 | Zaman et al. | |
| 11,489,788 B2 | 11/2022 | Zheng et al. | |
| 2003/0140263 A1* | 7/2003 | Arends | G06F 1/3253 713/320 |
| 2005/0034017 A1* | 2/2005 | Airaud | G06F 11/2242 714/25 |
| 2010/0174892 A1* | 7/2010 | Steeb | G06F 11/3632 712/E9.032 |
| 2011/0307741 A1* | 12/2011 | Chen | G06F 11/3648 714/E11.208 |
| 2012/0131309 A1* | 5/2012 | Johnson | G06F 9/323 712/E9.004 |
| 2013/0326203 A1* | 12/2013 | Usui | G06F 11/3656 712/E9.032 |
| 2014/0300490 A1 | 10/2014 | Kotz et al. | |
| 2017/0199835 A1 | 7/2017 | Kim et al. | |
| 2020/0183738 A1 | 6/2020 | Champigny | |
| 2020/0301754 A1 | 9/2020 | Fumey et al. | |
| 2021/0073125 A1 | 3/2021 | Duluk, Jr. et al. | |
| 2022/0113915 A1 | 4/2022 | Ki et al. | |
| 2022/0137819 A1 | 5/2022 | Dong et al. | |
| 2022/0342702 A1 | 10/2022 | Drory et al. | |
| 2022/0405454 A1 | 12/2022 | Kalyanasundaram et al. | |

OTHER PUBLICATIONS

Chi-Neng Wen, et al., "NUDA: A Non-Uniform Debugging Architecture and Non-Intrusive Race Detection for Many-Core," 2009 46th ACM/IEEE Design Automation Conference, San Francisco, Ca, USA, Date of Conference: Jul. 26-31, 2009, INSPEC Accession No. 10844567, Aug. 28, 2009, pp. 148-153, publisher IEEE.
U.S. Appl. No. 18/168,127, filed Feb. 13, 2023, not yet published, 35 pages.
Bekim Cilku et al.: "A dual-layer bus arbiter for mixed-criticality systems with hypervisors", 2014 12th IEEE International Conference on Industrial Informatics (INDIN), Jul. 27, 2014, pp. 147-151.
Ramya Jayaram Masti et al. : "Logical Partitions on Many-Core Platforms", Proceedings of The 2022 International Conference on Management of Data, ACMPUB27, New York, NY, USA, Dec. 7, 2015, pp. 451-460.
U.S. Appl. No. 18/168,127 Non Final OA issued on Aug. 12, 2025; 19 pages.
Zaruba et al.: "Manticore: A 4096-Core RISC-V Chiplet Architecture for Ultraefficient Floating-Point Computing," in IEEE Micro, vol. 41, No. 2, pp. 36-42, Mar. 1-Apr. 2021.

* cited by examiner

FIG. 2A

Figure 2B:
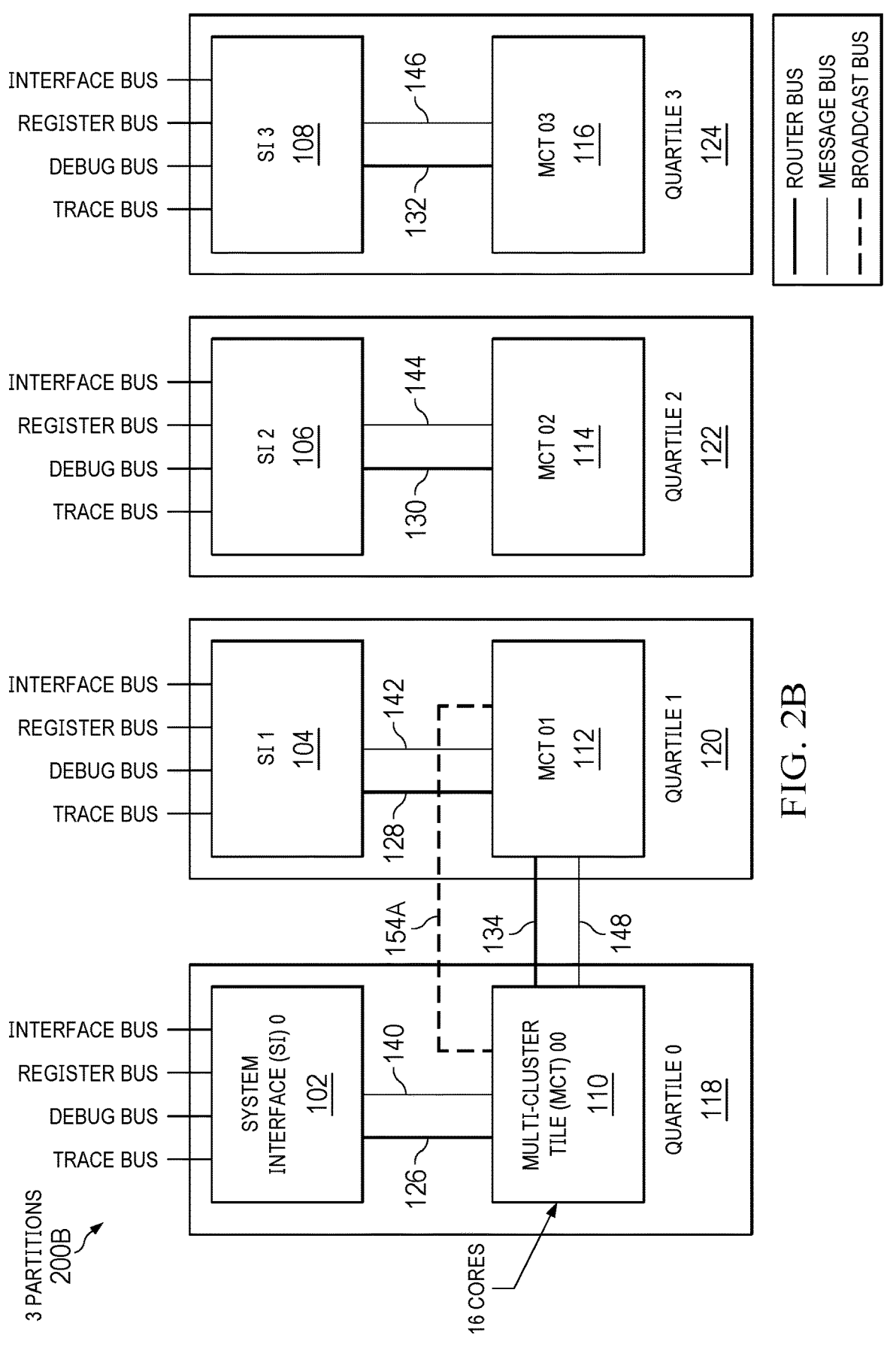

INTERFACE BUS

REGISTER BUS

DEBUG BUS

TRACE BUS

SI 3
108

146

132

MCT 03
116

QUARTILE 3
124

INTERFACE BUS

REGISTER BUS

DEBUG BUS

TRACE BUS

SI 2
106

144

130

MCT 02
114

QUARTILE 2
122

INTERFACE BUS

REGISTER BUS

DEBUG BUS

TRACE BUS

SI 1
104

142

128

MCT 01
112

QUARTILE 1
120

154A

134

148

INTERFACE BUS

REGISTER BUS

DEBUG BUS

TRACE BUS

SYSTEM
INTERFACE (SI) 0
102

140

126

MULTI-CLUSTER
TILE (MCT) 00
110

QUARTILE 0
118

16 CORES

3 PARTITIONS
200B

ROUTER BUS

MESSAGE BUS

BROADCAST BUS

SYSTEMS AND METHODS FOR DEBUGGING MULTI-CORE PROCESSORS WITH CONFIGURABLE ISOLATED PARTITIONS

CROSS-REFERENCE TO RELATED APPLICATIONS

This application claims priority under 35 U.S.C. § 119 to Indian Provisional patent application No. 202311009355, filed 13 Feb. 2023, the contents of which are incorporated by reference herein.

FIELD

This disclosure relates generally to data processing system architectures, and more specifically, to data processing systems with multiple cores.

BACKGROUND

Processors are electronic circuits capable of executing one or more sequences of instructions, tasks, or threads. In a conventional processor, operations are executed in series. As such, if an operation takes a long time to complete (e.g., if its completion depends upon the result of an external event), a subsequent operation still has to wait in a queue. The wait occurs even when execution of the subsequent operation is independent from that of the preceding operation, and regardless of whether the processor is otherwise available during that time.

In addition, a data processing system can have multiple processors or cores. Multiprocessor computer systems have been known for many years, but their architecture, in particular how software running on one processor interacts with software running on another processor, has generally made use of expensive and inefficient mechanisms such as shared memory and inter-processor interrupts when communication among processors is desired. However, when communication among processors is not desired, applications or instructions running in one processor might unintentionally or even maliciously corrupt or interfere with applications running on other processors.

The concept of multithreading or multitasking was developed, at least in part, to improve the use of available computing resources. Generally speaking, a multithreading or multitasking processor includes hardware support for switching between different instructions, tasks, or threads more efficiently than conventional processors.

As a processor operates, errors may occur. And, in the event of a processing error, techniques exist to capture state information of the processor at the time of the error. Such information may include, for instance, register values, pointers, program counters, condition codes, and the like. Once captured, a debugging tool may then be used to analyze that information. Even in the case of a multithreading processor or multiple processors, however, debug operations necessary to capture state information can cause the multithreading processor or the other processors to halt the execution of other instructions, applications, or threads.

BRIEF DESCRIPTION OF THE DRAWINGS

The present invention(s) are illustrated by way of example and are not limited by the accompanying figures, in which like references indicate similar elements. Elements in the figures are illustrated for simplicity and clarity and have not necessarily been drawn to scale.

FIG. 2A is a high-level block diagram overview depicting the creation of four isolated partitions in a multi-core processing system, according to some embodiments.

FIG. 2B is a high-level block diagram overview depicting the creation of three isolated partitions in a multi-core processing system, according to some embodiments.

DETAILED DESCRIPTION

Figure 1:
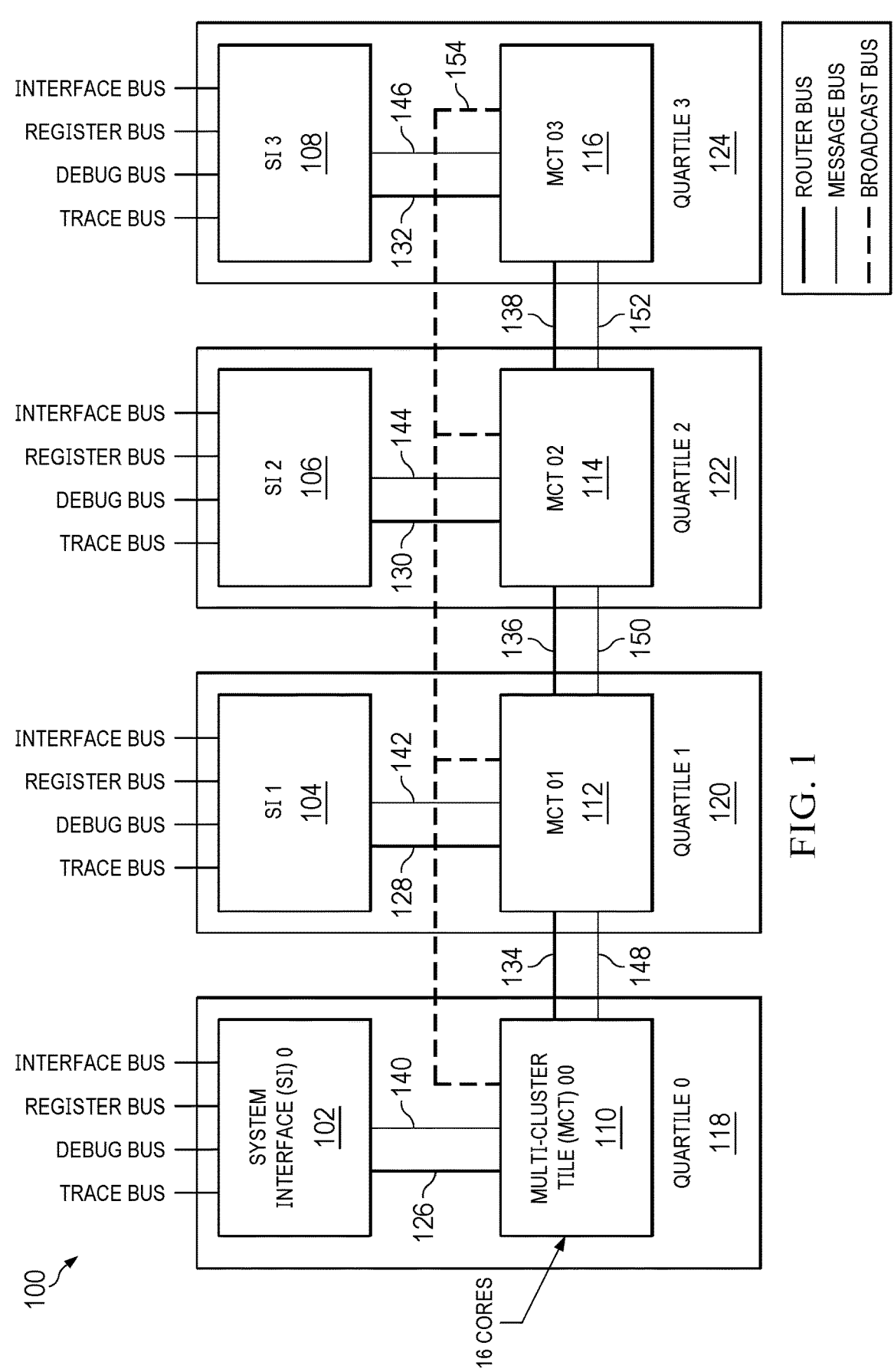
FIG. 1 depicts a high-level block diagram overview a multi-core processing system with which isolated partitions can be created in multiple types of configurations, according to some embodiments.

Systems and methods described herein are usable for dynamically creating multiple isolated partitions in a multi-core processing system, and debugging multi-core processors with configurable isolated partitions.

Some embodiments of the systems and methods described herein include a grid of many small, interconnected processing cores running at high frequency to allow for a high degree of parallelism. Due to the highly parallel nature of these embodiments, this grid can be proficient in AI applications such as accelerating Recurrent Neural Networks (RNNs), Temporal Convolutional Networks (TCNs) and math operations. Some of these embodiments provide for a mesh of core clusters. In some embodiments, each core cluster can be composed of four processing cores, along with L1 and L2 caches, and tightly coupled memories. The mesh architecture can provide for interconnections between all core clusters, in order to enable multi-core processing for an application, in some embodiments. The mesh can also provide for data sharing between core clusters (e.g., using a distributed L2 cache), access to external memory, send/receive messaging for collaboration, or broadcast signals for triggers, in some embodiments.

In addition, some embodiments provide for flexible isolation and virtualization features for the multi-core processing system. Instead of only supporting a single isolated partition with one virtual application, where the processing capability offered to an application is fixed at design time, some embodiments allow the multiple cores to be configured at run-time or start-up, in order to support various capabilities. These capabilities can include dividing the multiple processing cores into separate isolated partitions of various configurations, where each partition contains a subset of the multiple processing cores. In addition, these capabilities can include allowing multiple virtual applications to share the cores of the multi-core processing system. In some embodiments, multiple applications can share the cores of a single isolated partition. This sharing can occur while other applications share the cores of a different isolated partition, in some of these embodiments.

Isolated partitions can provide critical support for the virtualization of applications, in some embodiments. Isolation can ensure that virtual applications running in one isolated partition cannot corrupt or interfere in any way with virtual applications running in other isolated partitions, in some embodiments. Some embodiments can provide for multiple sets of memory-mapped virtual configuration registers, in order to provide support for multiple virtual applications per isolated partition. For example, 4 sets of memory-mapped virtual configuration registers can provide support for up to 4 virtual applications per isolated partition. If there are 4 partitions, for example, this allows for anywhere from 1 to 16 virtual applications to safely share the multi-core processing system.

In some embodiments, the multiple cores of a multi-core processing system can be segregated into core clusters and multi-cluster tiles. In some embodiments, each core cluster might contain 4 processing cores, for example. In some embodiments, each multi-cluster tile can contain 4 core clusters, which means a total of 16 processing cores, for example. In other embodiments, the number of cores per core cluster or per multi-cluster tile can differ, and these numbers should not be construed as limiting.

In some embodiments, the multi-core processing systems can segregate their multi-cluster tiles ("MCTs") into quartiles, where each quartile contains a quarter of the total processing cores. Different embodiments can have a different number of MCTs, and hence a different number of cores, per quartile. This specification will refer to the terms "low-end", "mid-range", "upper mid-range", and "high-end" to describe different configurations of a different number of MCTs, and hence a different number of cores, per quartile.

For example, a "low-end" configuration might include 1 MCT per quartile. Using the example of 16 cores per MCT, this would mean that each quartile includes 16 cores, for a total of 64 cores throughout the multi-core system. As another example, a "mid-range" configuration might include 2 MCTs per quartile. Using the example of 16 cores per MCT, this would mean that each quartile includes 32 cores, for a total of 128 cores throughout the multi-core system. As another example, an "upper mid-range" configuration might include 3 MCTs per quartile. Using the example of 16 cores per MCT, this would mean that each quartile includes 48 cores, for a total of 192 cores throughout the multi-core system. As another example, a "high-end" configuration might include 4 MCTs per quartile. Using the example of 16 cores per MCT, this would mean that each quartile includes 64 cores, for a total of 256 cores throughout the multi-core system. As stated previously, the number of cores per core cluster, or per MCT, or the number of MCTs per quartile can differ, and these numbers should not be construed as limiting.

As stated previously, the multiple cores of the multi-core system can be partitioned into separate isolated partitions of various configurations, where each partition contains a subset of the multiple processing cores. In some embodiments, the cores can be partitioned into any number of isolated partitions, from 1 all the way up to the total number of processing cores itself. In some embodiments, the number of cores per partition can be equal across the partitions. However, in other embodiments the number of cores per partition might be different for different partitions. In other embodiments, some partitions might have the same number of cores, while other partitions have a different number of cores.

Some embodiments use the previously described quartile structure of a multi-core processing system for the partitioning into the isolated partitions. However, other embodiments do not use a quartile structure of the processing cores for partitioning, and still other embodiments do not have a quartile structure of the processing cores at all. Some embodiments can use another kind of structuring of the processing cores for partitioning the processing cores into isolated partitions, and the previously described quartile structure is only one example of a processing core structure that can be used for partitioning.

Using the example of quartiles and MCTs, where each MCT contains 16 cores, then, for a "low-end" configuration that includes 1 MCT per quartile could have the following partition configuration: 1 isolated partition including 64 cores, 2 isolated partitions each including 32 cores, three isolated partitions where one partition includes 32 cores and the other two partitions including 16 cores, and 4 isolated partitions each including 16 cores. A "mid-range" configuration that includes 2 MCTs per quartile could have the following partition configuration: 1 isolated partition including 128 cores, 2 isolated partitions each including 64 cores, three isolated partitions where one partition includes 64 cores and the other two partitions including 32 cores, and 4 isolated partitions each including 32 cores. An "upper mid-range" configuration that includes 3 MCTs per quartile could have the following partition configuration: 1 isolated partition including 192 cores, 2 isolated partitions each including 96 cores, three isolated partitions where one partition includes 96 cores and the other two partitions including 48 cores, and 4 isolated partitions each including 48 cores. An "high-end" configuration that includes 4 MCTs per quartile could have the following partition configuration: 1 isolated partition including 256 cores, 2 isolated partitions each including 128 cores, three isolated partitions where one partition includes 128 cores and the other two partitions including 64 cores, and 4 isolated partitions each including 64 cores.

MCTs can be interconnected both internally and externally via mesh routers, in some embodiments, to enable multi-core processing for an application. In addition, directional steering can be supported for sharing distributed L2 cache read/write data between all core clusters, in some of these embodiments. The L2 cache can be distributed across the whole processing system, in some embodiments, such than any core cluster in any quartile may access any other core cluster's L2 cache, enabling a larger L2 cache for applications. Accesses to external memory can be directed to the associated system interface. Core clusters can also be interconnected to one another via send/receive bus for collaboration, and by broadcast signals for triggers. Run-time configurable isolated partitions can be created at start-up as needed for each client's application.

The isolated partitions provide support for virtualization, in some embodiments. Isolated partitions can assure that virtual applications running in one isolated partition cannot corrupt or interfere in any way with virtual applications running in other isolated partitions. Additionally, 4 sets of memory mapped virtual configuration registers provide support for up to 4 virtual applications per isolated partition, allowing for up to 4 virtual applications with 1 partition, or up to 16 virtual applications with 4 partitions, to safely share the processing system. Providing flexible run-time configurations at start-up for isolated partitions provides a mechanism for supporting many virtual applications, in some embodiments. A system interface can schedule each virtual application based on priority to effectively share the isolated partition(s). The processing system can provide a flexible run-time configurations at start-up for isolated partitions.

In various implementations and embodiments, the systems and methods described herein may also be used to provide debug support logic. Traditional debug methodologies are limited in their ability to provide debugging support for many-core parallel programming. Synchronization problems or bugs due to race conditions are particularly difficult to detect with software debugging tools. Most traditional debugging approaches rely on globally synchronized signals, but these pose problems in terms of scalability. Some embodiments overcome these problems by providing for debug support logic that can access information manipulated by one or more cores, with multiple applications or automatic context switch features, and without interfering with the processor's pipeline. As such, these systems and methods may allow having one or more applications in debug mode while others continue to execute.

Some embodiments provide for extensible debug support from the "low-end" version (which might be up to 64 cores, for example) to the "high-end" version (which might be up to 256 cores, for example). These embodiments can support individualized, simultaneous debug of configurable isolated partition options. For example, some of the quartile embodiments can support 1 isolated partition with all cores, with up to 4 isolated partitions each with ¼ of the cores. Furthermore, some embodiments provide simultaneous profiling support for multiple virtual applications per partition. For example, this can be 4 virtual applications per partition, for up to 16 virtual applications with 4 partitions. Therefore, these embodiments can provide debug and profiling support for a processing system with multiple cores, isolated partition options and virtual applications.

A debug architecture as described herein may be configured to support the partitioning of processing cores with context switching, where the context is stored in a memory or secondary register file. For example, such a system may include: (a) multiple partitions of processor cores (including pipeline and registers/flags), (b) context storage (memory or register file) per partition used to store application contexts with suspended execution, (c) a context unit per partition responsible for executing save/restore of context to/from the context storage from/into the processor state registers/flags, and (d) a debug support unit per partition, according to some embodiments.

For each partition, the foregoing debug architecture embodiments may context switch between multiple applications, saving and restoring them from the context storage. The context unit may execute a context switch upon a request from dedicated scheduling hardware, a software request, or a halt command from the debug support unit or the processor itself. Halt requests may make the context unit suspend the execution of the running application and save its context into the context storage, as it does in a application preemption operation. However, in this case, the halted application may only be put back into normal execution upon a request from the debug unit. This halting process may be performed with multiple applications, so that a plurality of them can be halted in a given time. The applications in halt state may have their contexts accessed by the debug unit through the arbitration of the context unit. The processor cores can continue executing code from other applications not halted, context switches being performed as usual.

In some embodiments, systems and methods for a debug architecture described herein may leverage hardware context memory and switch mechanism used in conventional multithreading applications to implement hardware debug support features. The same mechanism(s) used to save/restore application context to/from context storage may provide debug features such as breakpoint, single-step, register/flag examining and modification.

Run control debug (break, step, register dump) can function identically across all processing core versions (64 up to 256 cores), isolated partition configurations (1, 2, 3 and 4), and virtual applications (up to 16), in some embodiments. For these embodiments, the virtual applications can debug and profile their code securely without corrupting other virtual applications. All cores in all MCTs within an isolated partition (and none outside) can be simultaneously halted, single stepped, and interrogated. FIGS. 1, 2A, 2B, and 2C illustrate the different run-time configurations for isolated partitions for a "low-end" processing core version.

Like run control debug, trace debug can also expand across all processing core versions (64 up to 256 cores), isolated partition configurations (1, 2, 3 and 4), and virtual applications (up to 16), in some embodiments. Trace debug can be used for race condition issues and Software Quality Assurance (SQA). In some embodiments, however, trace bandwidth demands for many-core architectures are such that not everything can be visible because it exceeds Device Trace Port capability. Therefore, some of these embodiments provide for a focus trace on all cores and inter-core communication channels within a single MCT, per Quartile, for simultaneous visibility. Accordingly, 4 of 4 MCTs for a "low-end" configuration, 4 of 8 MCTs for a "mid-range" configuration, and 4 of 16 MCTs for a "high-end" configuration may be traced simultaneously. All can be covered sequentially for SQA.

Like run control debug, and trace debug, some embodiments can provide for profiling support across all processing core versions (64 to 256 Cores), isolated partition configurations (1, 2, 3 and 4), and virtual applications (up to 16). Performance and other profiling information can be collectable for each individual virtual application regardless of the processing core version and isolated partition configuration, in these embodiments.

In some embodiments, these systems and methods may be applicable to various types of cores, including microcontrollers, controllers, microprocessors, processors, central processing units (CPUs), programmable devices, etc., which are generically referred to herein as "processors" or "cores." In general, a processor may be configured to perform a wide variety of operations—and may take a variety of forms—depending upon its particular application (e.g., automotive, communications, computing and storage, consumer electronics, energy, industrial, medical, military and aerospace, etc.). Accordingly, as will be understood by a person of ordinary skill in the art in light of this disclosure, the processor(s) or core(s) described herein are provided only for sake of illustration, and numerous variations are contemplated.

FIG. 1 depicts a high-level block diagram overview a multi-core processing system (100) with which isolated partitions can be created in multiple types of configurations, according to some embodiments. FIG. 1 depicts a quartile embodiment where the processing system is divided into 4 quartiles (118, 120, 122, 124). Each of these 4 quartiles contain one MCT in the embodiment of FIG. 1. For example, quartile 0 (118) includes MCT 00 (110), quartile 1 (120) includes MCT 01 (112), quartile 2 (122) includes MCT 02 (114), and quartile 3 (124) includes MCT 03 (116). Other embodiments can have 2, 3, 4 or more MCTs per quartile. Other embodiments, might not have quartiles at all, but might be divided up into other configurations, such as thirds, fifths, sixths, etc. In the embodiment of FIG. 1, each MCT includes 16 processing cores. Of course, other embodiments can have a different number of processing cores per MCT.

In the embodiment of FIG. 1, each quartile also includes a system interface ("SI"). For example, quartile 0 (118) includes SI 0 (102), quartile 1 (120) includes SI 1 (104), quartile 2 (122) includes SI 2 (106), and quartile 3 (124) includes SI 3 (108). Each SI component has the same input/output ("I/O") busses that allow for external communication with the quartile. In the embodiment of FIG. 1, each SI component communicates with external entities using a trace bus, debug bus, register bus, and interface bus. Then each SI can communicate with its MCT using a router bus and a message bus. For example, SI 0 (102) communicates with MCT 00 (110) using router bus (126) and message bus (140). As another example, SI 1 (104) communicates with MCT 01 (112) using router bus (128) and message bus (142). As another example, SI 2 (106) communicates with MCT 02 (114) using router bus (130) and message bus (144). As another example, SI 3 (108) communicates with MCT 03 (116) using router bus (132) and message bus (146).

In the embodiments shown in FIG. 1, each MCT can also communicate with other MCTs that are physically adjacent to it, and within the same partition. The embodiment of FIG. 1 depicts one partition that encompasses all of the quartiles, and thus all of the MCTs. Therefore, MCT 00 (110) can communicate with adjacent MCT 01 (112) using a router bus (134) and message bus (148) between the MCTs. MCT 01 (112) can communicate with adjacent MCT 02 (114) using a router bus (136) and message bus (150) between the MCTs. MCT 02 (114) can communicate with adjacent MCT 03 (116) using a router bus (138) and message bus (152) between the MCTs. In addition, in the embodiments of FIG. 1, each of the MCTs can also communicate using a broadcast bus (154).

The router bus and message bus effectively be shared across the MCTs in a partition. The router and message bus can communicate north with the appropriate SI, south with any other MCTs in the quartile, and east/west with MCTs of other quartiles (as long as those other quartiles are within the same partition). The router bus can be used for L2 cache consistency, coherent data sharing, internal data accesses, or external data accesses, in some embodiments. For example, the router bus can communicate event messages between L2 caches in order to keep data consistent. These event messages might be load allocate or load modify event messages, for example.

The message bus can be a send/receive message bus that has custom instructions to send messages between cores, such as via ports. The message bus can be used for task scheduling, for example. In some embodiments, there might be "root core" per MCT, per quartile, or per partition, depending on the embodiment. The "root core" can be a task manager that can communicate with the other "worker cores." The "root core" can utilize the message bus to send and receive messages to the "worker cores" for example. The messages can tell the "worker cores" what work to do, for example. After receiving these messages via the message bus, the worker cores can start fetching data from a particular address and start working, in some embodiments. After one or more "worker cores" are done, they can notify the "root core" via the message bus, and then the "root core" can assign additional work to these one or more "worker cores."

The broadcast bus, in some embodiments, can be a smaller bus that is routed to all the MCTs in a partition. The broadcast bus can be used for synchronization between the cores, in some embodiments. A "root core" might send a broadcast signal on the broadcast bus to synchronize the "worker cores" for example. As another example, all the cores of a partition might be waiting on a broadcast signal on the broadcast bus to do something.

Figure 2A:
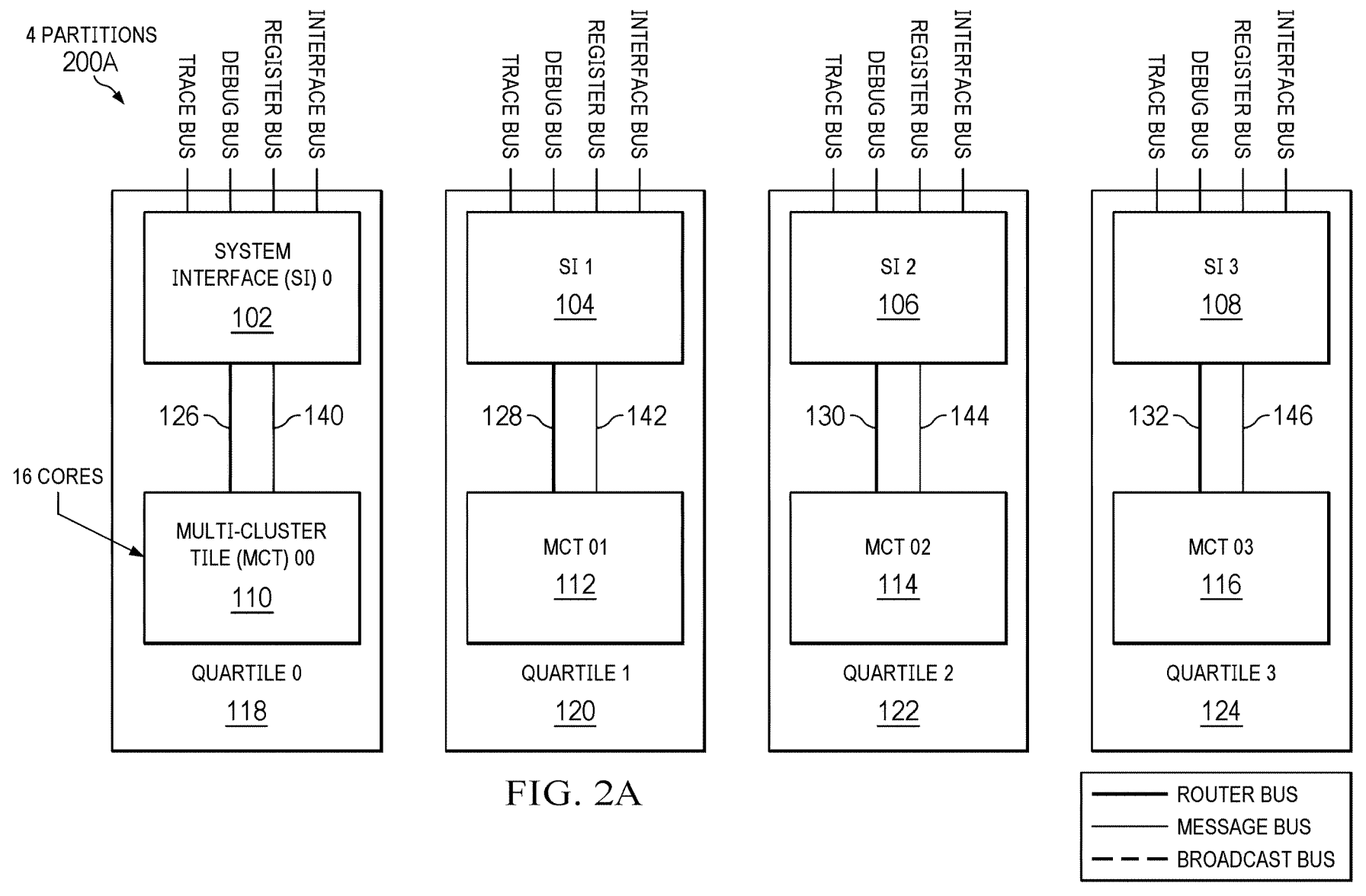

FIG. 2A is a high-level block diagram overview depicting the creation of four isolated partitions in a multi-core processing system, according to some embodiments. While FIG. 1 depicted all 4 quartiles as one partition, FIG. 2A instead depicts four partitions, with each quartile (118, 120, 122, and 124) as its own isolated partition. Each quartile (118, 120, 122, and 124) has its own MCT (110, 112, 114, and 116 respectively) and its own SI (102, 104, 106, and 108 respectively). Other embodiments can have 2, 3, 4 or more MCTs per quartile. Other embodiments, might not have quartiles at all, but might be divided up into other configurations, such as thirds, fifths, sixths, etc. In the embodiment of FIG. 2A, each MCT includes 16 processing cores. Of course, other embodiments can have a different number of processing cores per MCT.

In this case of FIG. 2A, the isolated partition control circuit may control one or more mesh routers to enable router bus connections 126-132 and disable router bus connections 134-138 (not shown). Additionally, or alternatively, the isolated partition control circuit may control one or more mesh routers to enable message bus connections 140-146 and disable message bus connections 148-152 (not shown). Additionally, or alternatively, the isolated partition control circuit may control one or more mesh routers to disable broadcast bus 154 across the different partitions (not shown). Therefore, in the embodiments depicted in FIG. 2A, the addressing for the caches will only be applicable to each partition (i.e. each quartile in the 4 partition case), instead of being applicable to all the quartiles (as in the 1 partition case).

FIG. 2B is a high-level block diagram overview depicting the creation of three isolated partitions in a multi-core processing system, according to some embodiments. While FIG. 1 depicted all 4 quartiles as one partition, and FIG. 2A depicted four partitions, FIG. 2B instead depicts three partitions, with quartiles (118, 120) as one isolated partition, and quartiles 122, and 124 as their own isolated partition. Each quartile (118, 120, 122, and 124) has its own MCT (110, 112, 114, and 116 respectively) and its own SI (102, 104, 106, and 108 respectively). Other embodiments can have 2, 3, 4 or more MCTs per quartile. However, in the case of quartiles 0 and 1 (118 and 120), the majority of one system interface can become inactive, and the control of the partition can be handled by the other system interface, in some embodiments. Other embodiments, might not have quartiles at all, but might be divided up into other configurations, such as thirds, fifths, sixths, etc. In the embodiment of FIG. 2B, each MCT includes 16 processing cores. Of course, other embodiments can have a different number of processing cores per MCT.

In the embodiments depicted by FIG. 2B, the isolated partition control circuit may control one or more mesh routers to enable router bus connections 126-134 and disable router bus connections 136 and 138 (not shown). Additionally, or alternatively, the isolated partition control circuit may control one or more mesh routers to enable message bus connections 140-148 and disable message bus connections 150 and 152 (not shown). Additionally, or alternatively, the isolated partition control circuit may control one or more mesh routers to enable only a portion of broadcast bus 154A between MCTs 110 and 112.

Figure 2C:
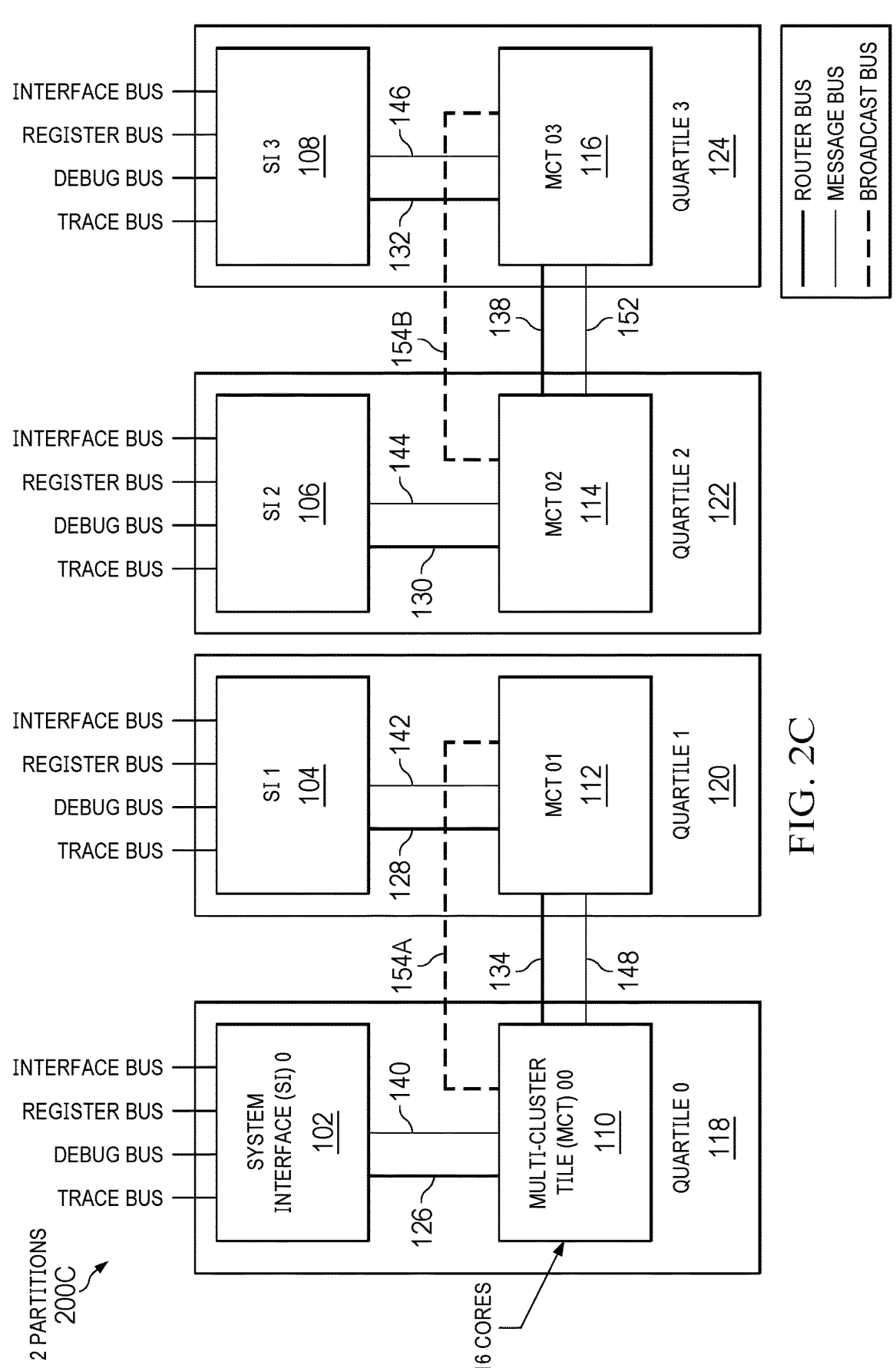
FIG. 2C is a high-level block diagram overview depicting the creation of two isolated partitions in a multi-core processing system, according to some embodiments.

FIG. 2C is a high-level block diagram overview depicting the creation of two isolated partitions in a multi-core processing system, according to some embodiments. While FIG. 1 depicted all 4 quartiles as one partition, FIG. 2A depicted four partitions, and FIG. 2B depicted three partitions, FIG. 2C instead depicts two partitions, with quartiles (118, 120) as one isolated partition, and quartiles (122, 124) as a second isolated partition. Each quartile (118, 120, 122, and 124) has its own MCT (110, 112, 114, and 116 respectively) and its own SI (102, 104, 106, and 108 respectively). Other embodiments can have 2, 3, 4 or more MCTs per quartile. However, in the case of quartiles 0 and 1 (118 and 120), the majority of one system interface can become inactive, and the control of the partition can be handled by the other system interface, in some embodiments. Similarly, in the case of quartiles 2 and 3 (122 and 124), the majority of one system interface (e.g. 106) can become inactive, and the control of the partition can be handled by the other system interface (e.g., 108), in some embodiments. Other embodiments, might not have quartiles at all, but might be divided up into other configurations, such as thirds, fifths, sixths, etc. In the embodiment of FIG. 2B, each MCT includes 16 processing cores. Of course, other embodiments can have a different number of processing cores per MCT.

In the embodiments depicted by FIG. 2C, the isolated partition control circuit may control one or more mesh routers to enable router bus connections 126-134, 138 and disable router bus connection 136 (not shown). Additionally, or alternatively, the isolated partition control circuit may control one or more mesh routers to enable message bus connections 140-148, 152 and disable message bus connection 150 (not shown). Additionally, or alternatively, the isolated partition control circuit may control one or more mesh routers to enable only a portion of broadcast bus 154A between MCTs 110 and 112, and also between MCTs 114 and 116, but not between MCTs 112 and 114.

Figure 3:
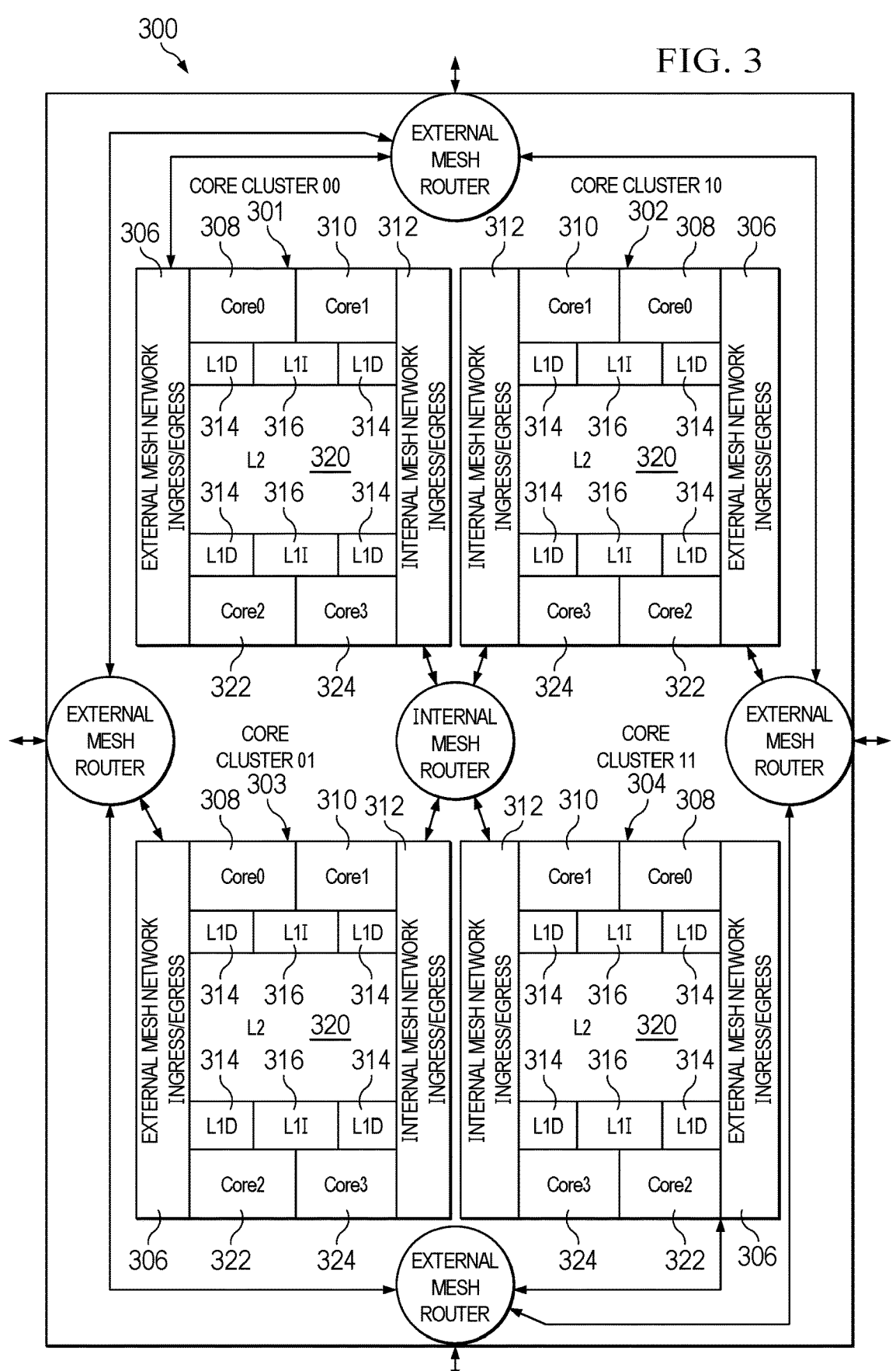
FIG. 3 is a high-level block diagram of a multi-cluster tile featuring 16 processing cores and an internal and external mesh network for communication, according to some embodiments.

FIG. 3 is a high-level block diagram of a multi-cluster tile (MCT) featuring 16 processing cores and an internal and external mesh network for communication, according to some embodiments. The MCT (300) contains four core clusters: core cluster 00 (301), core cluster 01 (303), core cluster 10 (302), and core cluster 11 (304). Each core cluster contains four cores: Core 0 (308), Core1 (310) Core 2 (322) and Core3 (324). Each core has its own level 1 cache LID. Core 0 (308) is associated with one LID 314, Core1 (310) is associated with a different LID 314, Core2 (322) is associated with a different LID 314, and Core3 (324) is associated with a different L1D 314. Two adjacent cores share a portion of the L1 cache, notated as L1I (316).

In addition, each core cluster has a larger L2 cache, denoted L2 (320). The L2 cache can be shared across all the cores in a partition, in some embodiments. In some embodiments, the L2 cache can be fully coherent in a snoop-less manner. The L2 can allow the sharing of coherent data between all the cores in a partition, in some embodiments. The L2 cache can utilize the internal and external mesh network, such as the router bus, to facilitate the sharing of this data, in some embodiments.

The cores (308, 310, 322, 324) within a core cluster can communicate with each other. In addition, a core cluster can communicate with other core clusters in the MCT through the internal mesh router. The internal mesh router is coupled to an internal mesh network ingress/egress component (312) for each core cluster (301, 302, 303, 304) that facilitates the I/O between the core cluster and the internal mesh router. In addition, each core cluster (301, 302, 303, 304) also includes an external mesh network ingress/egress component (306) that facilitates communication to the external mesh through the external mesh routers.

The MCT (300) of FIG. 3 also includes four external mesh routers: one at the bottom of FIG. 3 to communicate to an MCT placed below this MCT on the physical die; one at the right-side of FIG. 3 to communicate with an MCT placed to the right of this MCT on the physical die; one on the left-side of FIG. 3 to communicate with an MCT placed to the left of this MCT on the physical die; and one at the top of FIG. 3 to communicate with either an MCT or a SI component placed above this MCT on the physical die. The external mesh routers and the external mesh network ingress/egress (306) can support signaling for the router bus and message bus as depicted in FIG. 1. Each of the external mesh routers can communicate with its neighbor mesh routers. In addition, each external mesh router communicates with the external mesh network ingress/egress (306) of one core cluster. For example, the external mesh network ingress/egress (306) of core cluster 00 (301) directly communicates with the top-side external mesh router. The external mesh network ingress/egress (306) of core cluster 01 (303) directly communicates with the left-side external mesh router. The external mesh network ingress/egress (306) of core cluster 10 (302) directly communicates with the right-side external mesh router. The external mesh network ingress/egress (306) of core cluster 11 (304) directly communicates with the bottom-side external mesh router.

Figure 4:
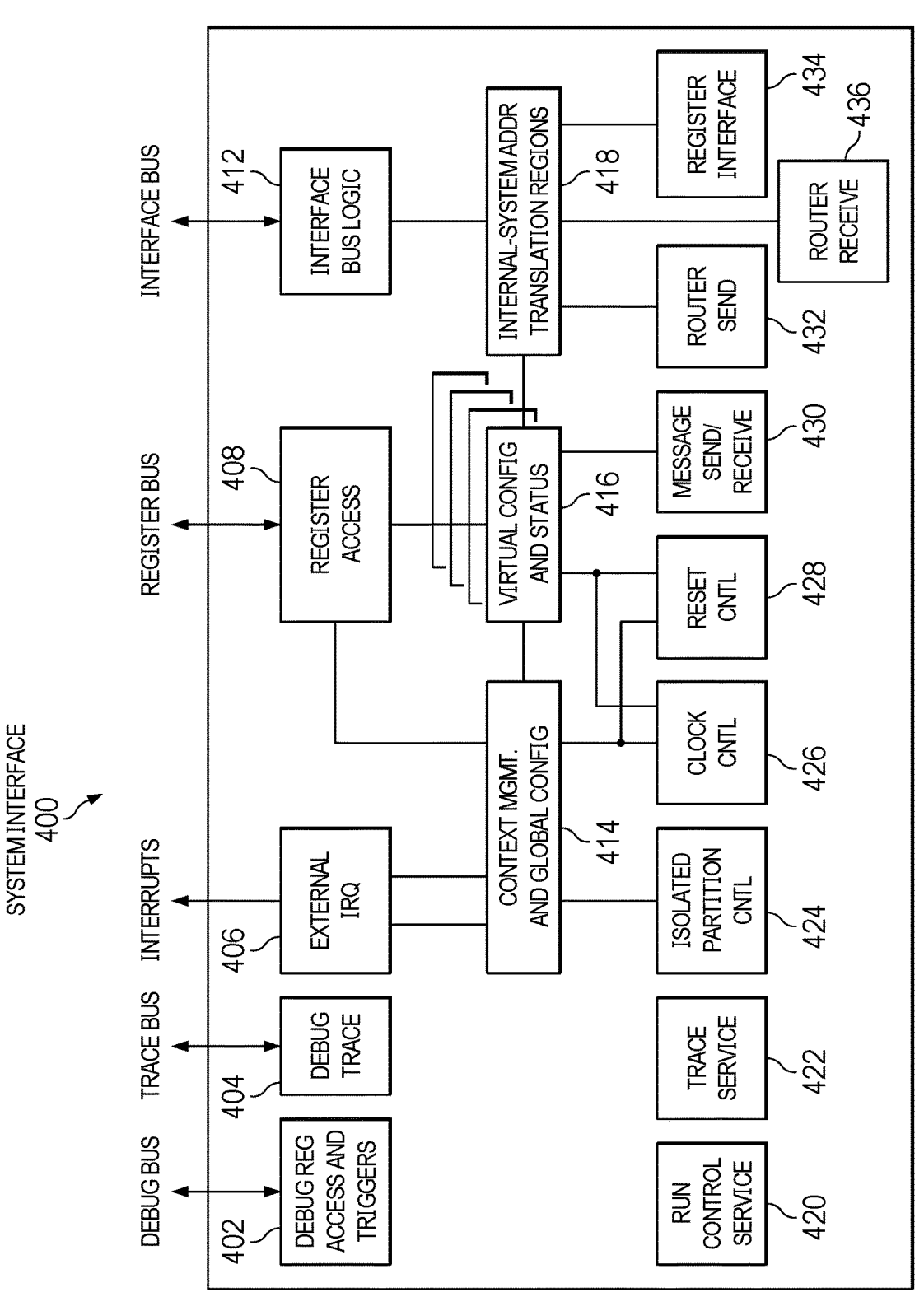
FIG. 4 is a high-level block diagram of a system interface for a quartile of a multi-core processing system, according to some embodiments.

FIG. 4 is a high-level block diagram of a system interface ("SI") (400) for a quartile of a multi-core processing system, according to some embodiments. As depicted in FIG. 1, the SI (400) has 4 different busses to communicate with external components: the debug bus, the trace bus, the register bus, and the interface bus. In addition, the SI (400) includes an external IRQ (406) component that provides interrupts to the external components from the multi-core processing system. The debug bus is coupled to a debug register access and triggers component (402) within the SI. This component in turn communicates with the run control service component (420) to handle debugging activities. The trace bus is coupled to a debug trace component (40) within the SI. This debug trace component (404) in turn communicates with the trace service (422) component to handle signal tracing within the MCTs for debugging purposes.

The register bus is connected to a register access component (408) within the SI. This register access component (408) is in turn coupled to a context management and global configuration component (414). This context management component provides for context switching between the up to 4 supported virtual applications of a partition. The 4 sets of virtual configuration and status (416) provide for 4 sets of memory-mapped virtual configuration registers, in order to provide support for up to 4 virtual applications per isolated partition. For example, the 4 sets of memory-mapped virtual configuration and status components (416) can provide support for up to 4 virtual applications per isolated partition. If there are 4 partitions, for example, this allows for anywhere from 4 to 16 virtual applications to safely share the multi-core processing system.

The interface bus is connected to interface bus logic (412) within the SI, which in turn communicates with internal-system address translation regions (418). The internal-system address translation regions (418) communicate with the router send component (432) which sends communications on the router bus to the MCT placed directly below this SI (400). The internal-system address translation regions (418) also communicate with the router receive component (436) which receives communications on the router bus from the MCT placed directly below this SI (400). The internal-system address translation regions (418) communicate with the register interface (434) which provides registers for the internal system address translation regions (418).

The message send/receive component (430) sends and receives communications on the message bus to/from the MCT placed directly blow this SI (400). The clock and reset control circuits (426, 428) provide clock and reset functionality to the MCTs in the quartile. The isolated partition control circuit (424) which communicates with the context management and global configuration component (414), provides control for the isolated partition configuration, as explained in FIGS. 2A-2C. The isolated partition control component (424) may control one or more mesh routers in its quartile to enable router bus connections within the isolated partition, and to disable router bus connections between different isolated partitions. Additionally, or alternatively, the isolated partition control circuit (424) may control one or more mesh routers to enable message bus connections within the isolated partition, and disable message bus connections between different isolated partitions. Additionally, or alternatively, the isolated partition control component (424) may control one or more mesh routers to enable only a portion of broadcast bus between MCTs within an isolated partition, but not between MCTs of different partitions.

Figure 5:
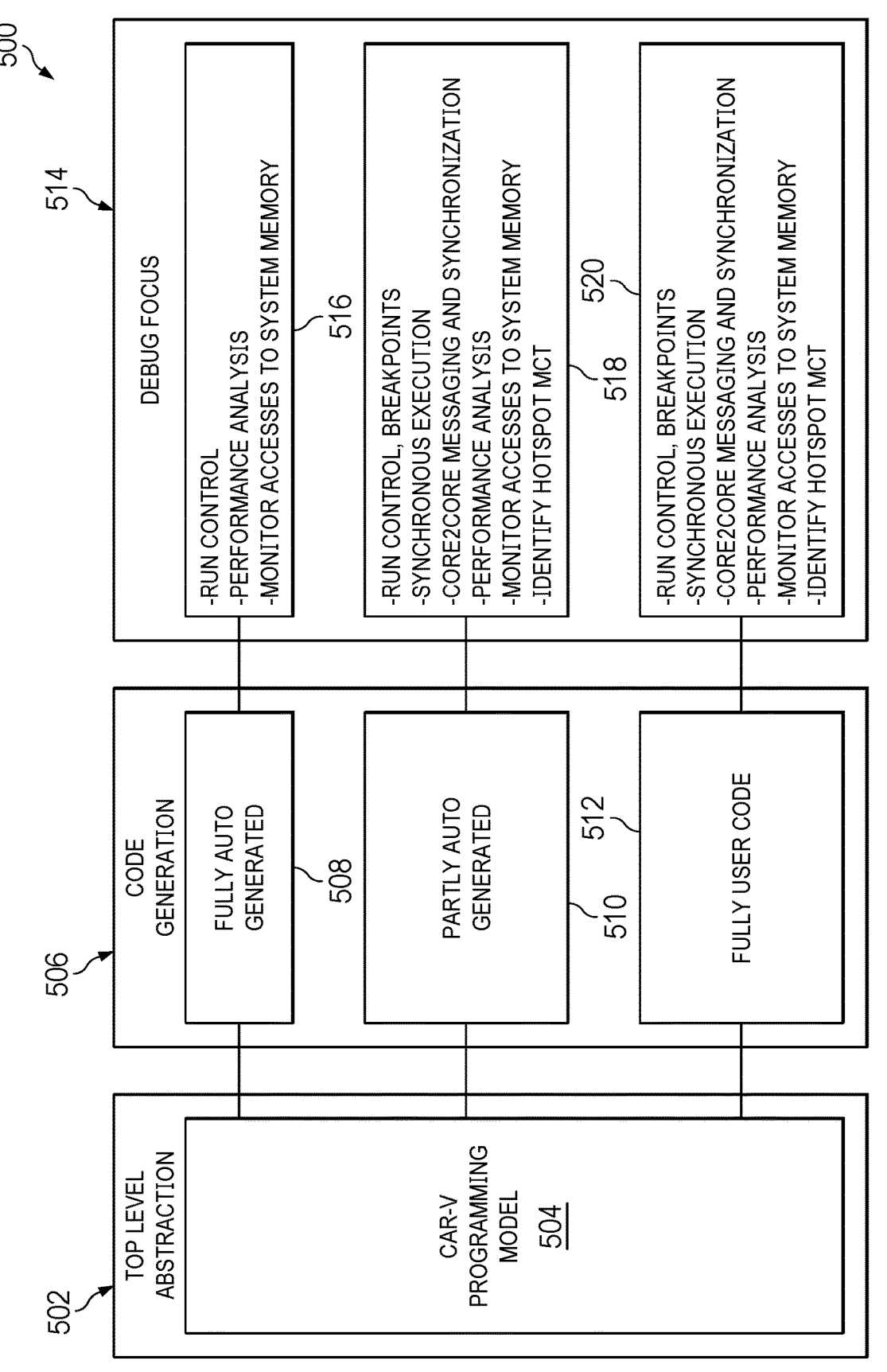
FIG. 5 is a user perspective of a programming model for debugging applications within the multi-core processing system, according to some embodiments.

FIG. 5 is a user perspective (500) of a programming model for debugging applications within the multi-core processing system, according to some embodiments. From the user perspective, the top-level abstraction (502) for debugging a multi-core processing system includes a programming model (504). The programming model can provide for three different types of code generation (506). The code can be fully auto generated (508), or partially auto generated (510), or fully user code (512). In addition, there can be different debugging focuses (514), depending on the type of code generation (506). For fully auto generated code (508), the debugging focus can be: run control, performance analysis, and monitoring accesses to system memory as depicted in block 516. For partially auto generated code (510) and fully user code (512), the debugging focus can be: run control, breakpoints, synchronous execution, core2core messaging and synchronization, performance analysis, monitor accesses to system memory, and identifying hotspot MCTs, as depicted in blocks 518 and 520.

Figure 6:
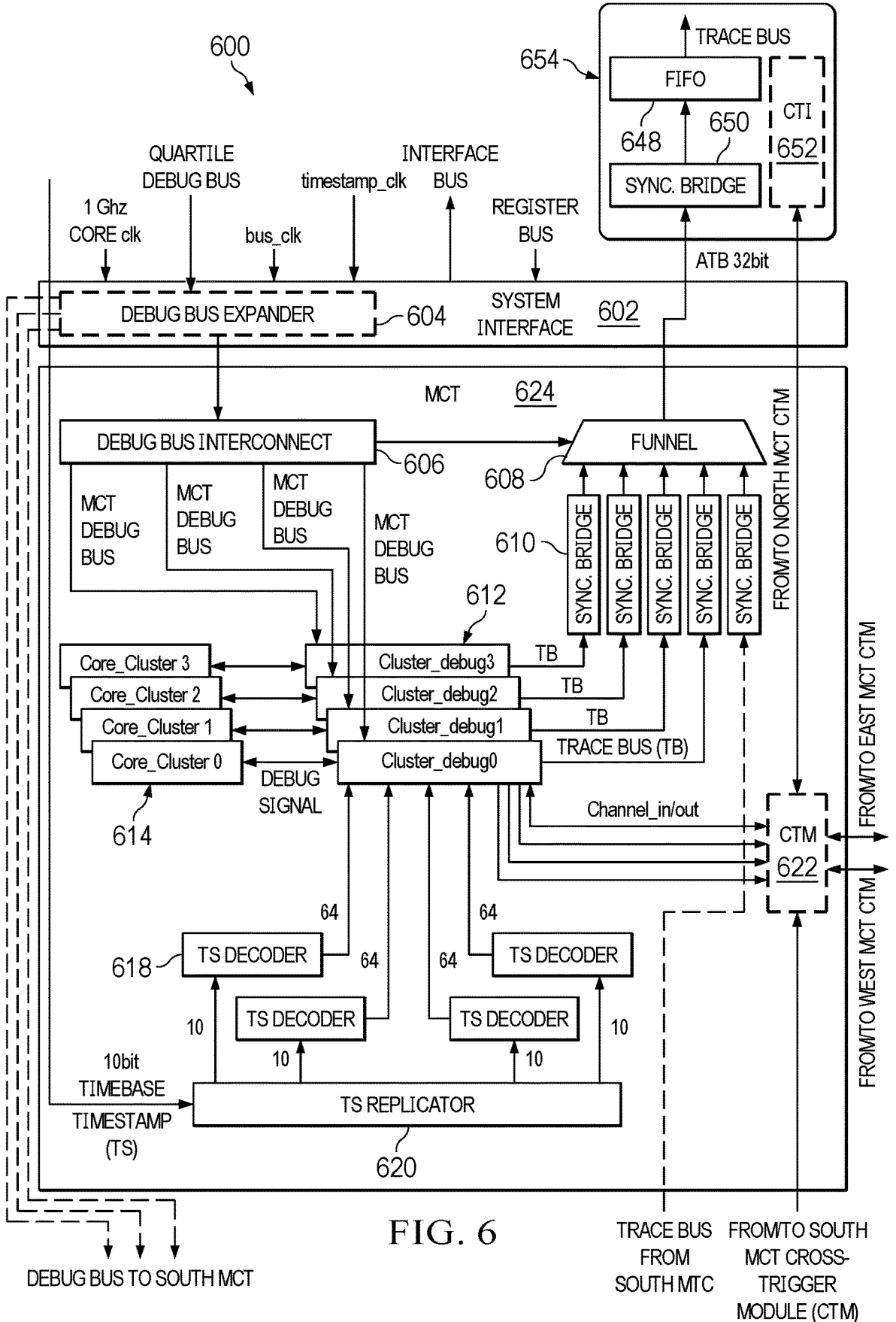
FIG. 6 is a high-level block diagram of the debugging, tracing, and triggering components within and between a system interface and an multi-core tile.

FIG. 6 is a high-level block diagram of the debugging, tracing, and triggering components within and between a system interface and a multi-core tile. FIG. 6 depicts the MCT (624) of FIG. 3, and the SI (602) of FIG. 4, but instead focuses on the debugging, tracing, and triggering sub-components of these components. Core_Clusters 0, 1, 2, and 3 (614) of FIG. 6 correspond to the core clusters 00 (301), 01 (303), 10 (302), and 11 (304) of FIG. 3. Each of the core clusters 0, 1, 2, and 3 (614) of FIG. 6 has an associated respective core cluster_debug component 0, 1, 2, and 3 (612) to which it is coupled. A core_cluster is coupled to its associated cluster_debug component by multiple debug signals. These debug signals can include one or more of: an instruction bus for an instruction trace, a data bus for a data trace, and channel-in and channel-out signals for triggering.

The system interface (SI) (602) communicates to external components using the quartile debug bus, the interface bus, the register bus, and the trace bus, as depicted in FIG. 4. The SI (602) also has three different clocks input to it: a 1 Ghz core clock for the cores, a bus clock for at least the register and debug busses, and a timestamp clock for the timestamp components.

The quartile debug bus is input into a debug bus expander (604) which propagates the debug bus to each of the MCTs in the quartile. Using the example embodiments given previously, a "low-end" configuration might include 1 MCT per quartile, a "mid-range" configuration might include 2 MCTs per quartile, an "upper mid-range" configuration might include 3 MCTs per quartile, and a "high-end" configuration might include 4 MCTs per quartile. Therefore, if the configuration were a low-end example, then MCT (624) would be the only MCT in the quartile, and the debug bus would not be propagated by the debug bus expander (604) to any further MCTs. Once a debug bus is propagated to an MCT, then the debug bus connects to a debug bus interconnect (606) that provides the MCT debug bus to each of the cluster_debug 0, 1, 2, and 3 components (612) respectively. This debug_bus can provide any processor cores within an isolated partition a debug command without affecting any operation of any other processor core of any other isolated partition. The debug command can be at least one of: a break, a step, or a register dump command.

Each cluster_debug 0, 1, 2, and 3 component (612) also is provided a timestamp using the timestamp circuitry of the MCT. Each MCT is provided a 10-bit timebase timestamp ("TS") to a TS replicator (620). The TS replicator provides the 10-bit timebase timestamp to 4 different TS decoder (618). The TS decoders (618) decodes the timestamp information into a 64-bit timestamp that is in turn provided to each of the cluster_debug 0, 1, 2, and 3 components (612) respectively. The timestamp components generate and distribute consistent timestamp values to multiple destinations the multi-core processing system, according to some embodiments. The 10-bit timestamp components can be used to distribute narrow timestamps around the SoC in some embodiments. The narrow timestamp interconnect provides a mechanism for efficiently distributing 10-bit timestamp values across a potentially large system in a cost-effective way. It has the following features: full 64-bit timestamp values are distributed using a 10-bit interface that cases system wire routing; a decoded timestamp value is presented as a natural binary number to software, and decoded timestamp value of zero indicates an unknown timestamp, for example when resynchronizing.

Each cluster_debug 0, 1, 2, and 3 component (612) also provides a trace bus ("TB") that can be used to provide an instruction trace or a data trace for a particular core or core cluster (614). Each cluster_debug component can contain a hardware macrocell that, when connected to a core, outputs trace information on a trace port. The cluster_debug provides core-driven trace through a trace port. A cluster_debug component can support instruction trace, in some embodiments, and might support data trace as well, in some embodiments. The trace bus for each cluster_debug 0, 1, 2, and 3 component (612) is input into a synchronous bridge (610) before being input into a funnel (608). The funnel (608) acts as a kind of multiplexor that selects the appropriate trace bus from the appropriate cluster_debug component (612) or the trace bus from the MCT placed below (South) of the current MCT (when there are multiple MCTs per quartile). If there was just one MCT per quartile, then there would be no MCT placed below (South) of the current MCT. The output of the funnel is provided to another synchronous bridge (650) before being input into a FIFO (648) and output as the trace bus to external components. This circuitry that receives the output of the funnel can be part of the SI (602), in some embodiments, or can be separate circuitry (654) as depicted in FIG. 6. The processor cores within the isolated partition to be traced without affecting any operation of any other processor core of any other isolated partition.

Furthermore, some embodiments provide simultaneous profiling support for multiple virtual applications per partition. For example, there can be 4 virtual applications per partition. In some preferred embodiments, virtual applications are intended to run to completion, with no application preemption. In some of these embodiments, there is no context switching. In these embodiments, debug does not change the virtual application in progress, but simply allows for debug of it. In these embodiments, when breaking an application, the processor is halted. In other embodiments, however, the context management and global configuration component (414) of the SI (400) of FIG. 4 can communicate with one or more of the four different virtual configuration and status components (416) to context switch between multiple applications, saving and restoring them from the context storage. The context management unit (414) may execute a context switch upon a request from dedicated scheduling hardware, a software request, or a halt command from a debug support unit or the processor itself. Halt requests may make the context unit suspend the execution of the running application and save its context into the context storage, as it does in an application preemption operation. However, in some of these embodiments, the halted application may only be put back into normal execution upon a request from a debug unit. This halting process may be performed with multiple applications, so that a plurality of them can be halted in a given time. The applications in halt state may have their contexts accessed by a debug unit through the arbitration of the context unit. In these embodiments, the processor cores can continue executing code from other applications not halted, context switches being performed as usual.

In some embodiments, a synchronous bridge enables the data transfer between synchronous clock domains. A synchronous bridge can include one or more registers that latch the value of the bus for a period of time so that the values of the bus can be propagated further to the destination without becoming corrupted.

Each MCT also includes a cross-trigger matrix ("CTM") (622) that can provide trigger support for the isolated partitions. The CTM 622 communicates with a cross-trigger interface ("CTI") (652) of circuitry 654. A CTM combines the trigger requests generated by one or more CTIs and broadcasts them to all CTIs as channel triggers. A CTI provides the interface between a processor and the CTM. A channel-in and a channel-out signal is routed from the CTM to each of the cluster_debug 0, 1, 2, and 3 components (612). Each of the cluster_debug 0, 1, 2, and 3 components (612) can include its own CTI, which acts as an interface between the CTM (622) and the respective core_cluster 0, 1, 2, or 3 (614) that is associated with respective cluster_debug component. A core_cluster (614) can receive a trigger via a channel-in signal from the CTM (622) that is routed through its associated cluster_debug (612) component, where the associated cluster_debug (612) component can include its own CTI, which acts as an interface between the CTM (622)

and the respective core_cluster (614). In addition, in some embodiments, a core of a core_cluster (614) can also trigger other cores via a channel-out signal that is routed through its associated cluster_debug (612) component (and potentially a CTI of the cluster_debug component) to the CTM (622). In some embodiments, the CTM (622) may also receive inputs from an external development tool or from another component of the system. In some of these embodiments, the CTM (622) can generate outputs to an external development tool as well.

This cross-triggering circuitry can run or stop or step cores in a partition. The cross-triggering circuitry can also provide an isolated debug capability per partition through the trigger routing service. This can provide cross-triggering capability at a partition level for run control (where a partition can include either single or multiple quartiles). For example, a SI can be configured to allow all processor cores within the isolated partition to be at least one of: halted, single-stepped, or interrogated, without affecting any operation of any other processor core of any other isolated partition. A trigger can allow the starting and stopping of trace bus tracing for a particular partition and a particular virtual application executing on the partition.

Since each MCT includes a CTM (622), the plurality of MCTs of a multi-core processing system necessarily includes a plurality of CTMs. The SI (602 of FIG. 6, 400 of FIG. 4) can be configured to control at least one of the plurality of CTMs to enable or disable at least a portion of the debug network to allow an isolated partition to be debugged independently of another isolated partition. In some embodiments, the SI is configured to control another one or more of the plurality of CTMs to enable or disable at least another portion of the debug network to allow a reconfigured isolated partition to be debugged independently of another reconfigured isolated partition. In some embodiments, the SI can be configured to control the plurality of CTMs at run-time. In some embodiments, the SI can be configured to control the plurality of CTMs in response to an indication that the isolated partitions have been reconfigured. In some embodiments, the isolated partition control circuitry (424) of the SI performs this functionality.

All the CTMs of the plurality of MCTs can establish a debug network among the MCTs. The CTM (622) of the MCT (624) can be connected to the East or West (right-side or left-side) place MCTs, when those MCTs are part of the same partition. If those MCTs are not part of the same partition, then the CTM (622) is disconnected from the CTMs of those partitions. For configurations where there are more than one MCT per quartile, then the CTM (622) can be connected from/to South (bottom-side) MCT CTMs as shown in FIG. 6. A CTM can be connected to CTMs of its same isolated partition, and disconnected from CTMs of other isolated partitions by the same isolated partition control circuit that controls the one or more mesh routers to enable bus connections and disable other bus connections to create the isolated partitions. In some embodiments, the SI is configured to designate the portion of the debug network segment as inactive, at least in part, in response to different MCTs belonging to different quartiles being assigned to a same isolated partition. In some embodiments, the SI is configured to select the portion of the debug network based, at least in part, upon a configuration of the isolated partitions of processor cores.

Figure 7:
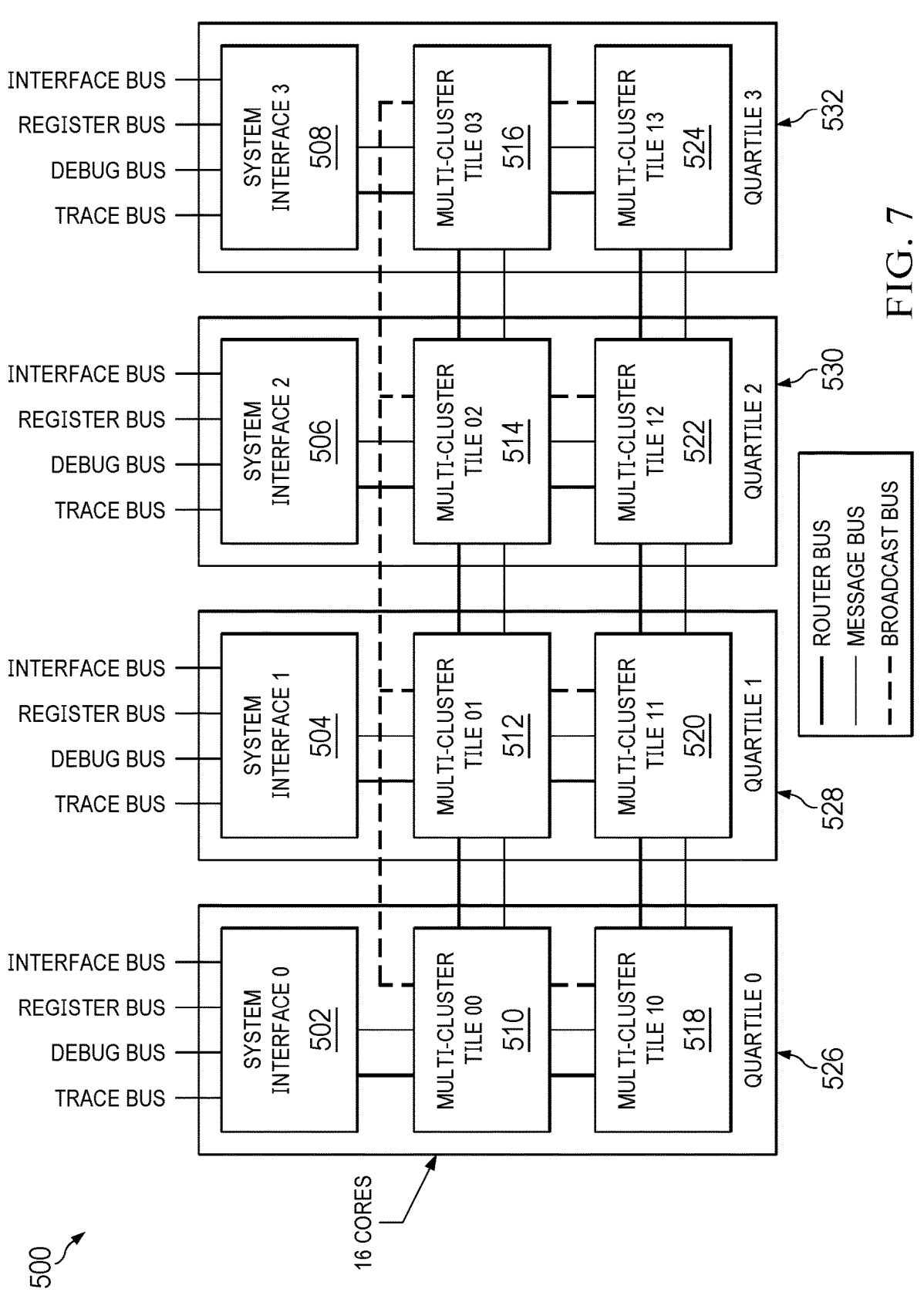
FIG. 7 is a high-level block diagram of a multi-core processing system that has two multi-cluster tiles per quartile, and where isolated partitions can be created in multiple types of configurations, according to some embodiments.

FIG. 7 is a high-level block diagram of a multi-core processing system that has two multi-cluster tiles per quartile, and where isolated partitions can be created in multiple types of configurations, according to some embodiments. In the embodiment of FIG. 7, each quartile contains two MCTs. This can be called a "mid-range" configuration in some embodiments. For example, quartile 0 (726) includes MCT 00 (710) and MCT 10 (718). Quartile 1 (728) includes MCT 01 (712) and MCT 11 (720). Quartile 2 (730) includes MCT 02 (714) and MCT 12 (722). Quartile 3 (732) includes MCT 03 (716) and MCT 13 (724). Similar to the embodiments shown in FIGS. 2A-2C, the quartiles of FIG. 7 can be partitioned into isolated partitions.

As shown, FIG. 7 contains one partition and includes all 4 quartiles. However, the isolated partition control component (424) may control one or more mesh routers to enable only a portion of the router, broadcast, and message busses within an isolated partition, but disable those busses between isolated partitions. For example, similar to FIG. 2A, the isolated partition control component (424) can create 4 isolated partitions by disabling all the router, broadcast, and message busses between MCTs of different quartiles. Therefore, the broadcast, message and router busses would be disabled between the following MCTs: between MCT 00 (710) and MCT 01 (712); between MCT 01 (712) and MCT 02 (714); between MCT 02 (714) and MCT 03 (716); between MCT 10 (718) and MCT 11 (720); between MCT 11 (720) and MCT 12 (722); and between MCT 12 (722) and MCT 13 (724). As another example, similar to FIG. 2B, the isolated partition control component (424) can create 3 isolated partitions by enabling the router, broadcast, and message busses between quartile 0 (726) and quartile 1 (728), but disabling the router, broadcast, and message busses between quartile 1 (728) and quartile 2 (730), and between quartile 2 (730) and quartile 3 (732). As another example, similar to FIG. 2C, the isolated partition control component (424) can create 2 isolated partitions by enabling the router, broadcast, and message busses between quartile 0 (726) and quartile 1 (728), and between quartile 2 (730) and quartile 3 (732), but disabling the router, broadcast, and message busses between quartile 1 (728) and quartile 2 (730).

Figure 8:
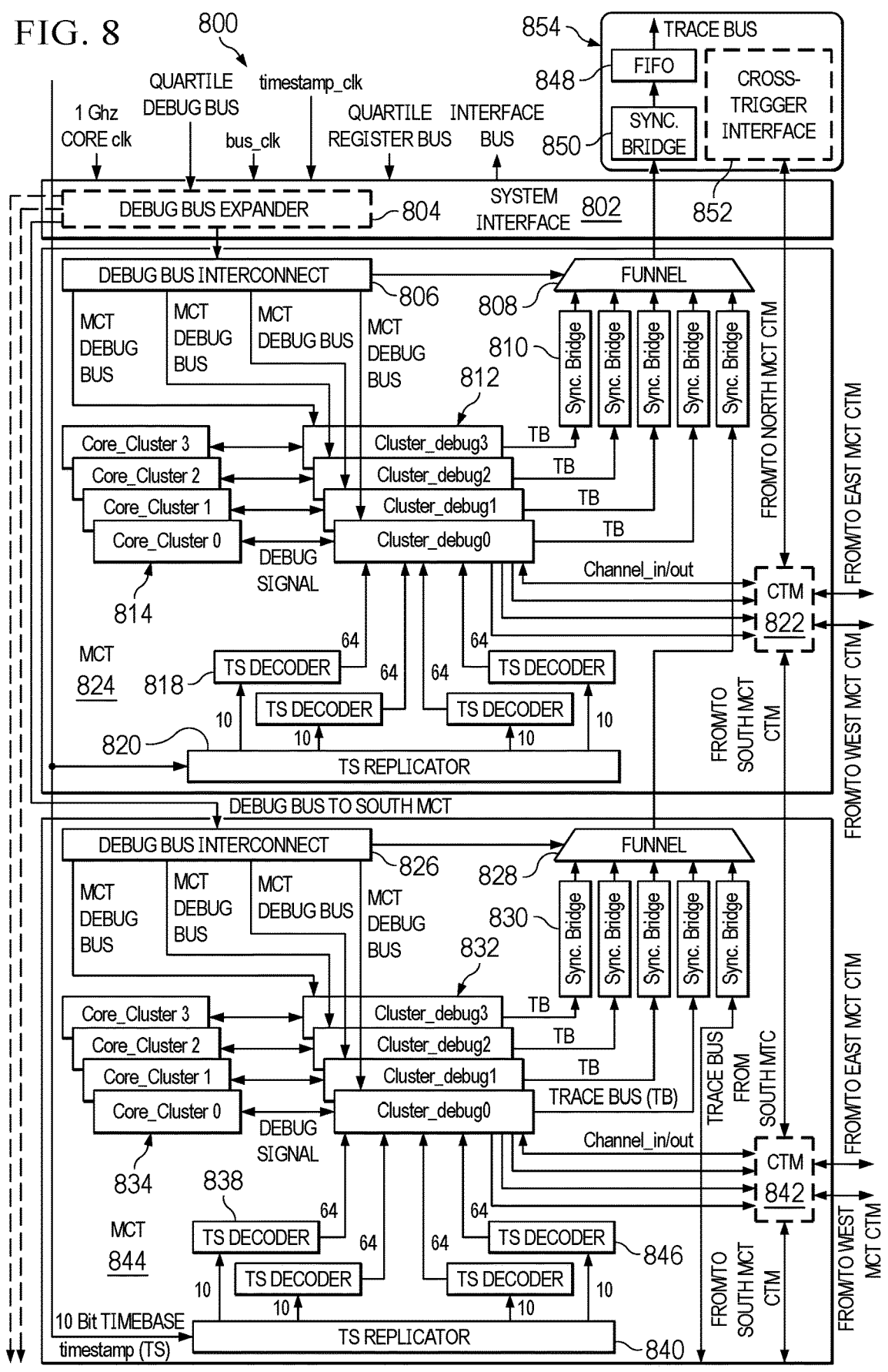
FIG. 8 is a high-level block diagram of the debugging, tracing, and triggering components within and between a system interface and two multi-core tiles of the same quartile.

FIG. 8 is a high-level block diagram of the debugging, tracing, and triggering components within and between a system interface and two multi-core tiles of the same quartile. FIG. 8 shows the debugging, tracing, and triggering components within one quartile of the configuration of FIG. 7, either quartile 0 (726), quartile 1 (728), quartile 2 (730), or quartile 3 (732). In FIG. 7 each quartile contains two MCTs for a "mid-range" configuration. The same "mid-range" configuration is shown in FIG. 8. FIG. 8 shows similar components as FIG. 6, but instead of only one MCT as depicted in FIG. 6, FIG. 8 depicts two MCTs (824, 844) in a quartile, along with one SI 802.

Core_Clusters 0, 1, 2, and 3 (814, 834) of FIG. 8 correspond to the core clusters 00 (301), 01 (303), 10 (302), and 11 (304) of FIG. 3. Each of the core clusters 0, 1, 2, and 3 (814, 834) of FIG. 6 has an associated respective core cluster_debug component 0, 1, 2, and 3 (812, 832) to which it is coupled. A core_cluster is coupled to its associated cluster_debug component by multiple debug signals. These debug signals can include one or more of: an instruction bus for an instruction trace, a data bus for a data trace, and channel-in and channel-out signals for triggering.

The system interface (802) communicates to external components using the quartile debug bus, the interface bus, the register bus, and the trace bus, as depicted in FIG. 4. Like FIG. 6, the SI (802) also has three different clocks input to it: a 1 Ghz core clock for the cores, a bus clock for at least the register and debug busses, and a timestamp clock for the timestamp components.

The quartile debug bus is input into a debug bus expander (804) which propagates the debug bus to each of the MCTs in the quartile. FIG. 8 depicts a "mid-range" configuration that includes 2 MCTs per quartile. Once a debug bus is propagated to an MCT, then the debug bus connects to a debug bus interconnect (806, 826) that provides the MCT debug bus to each of the cluster_debug 0, 1, 2, and 3 components (812, 832) respectively. This debug_bus can provide any processor cores within an isolated partition a debug command without affecting any operation of any other processor core of any other isolated partition. The debug command can be at least one of: a break, a step, or a register dump command.

Each cluster_debug 0, 1, 2, and 3 component (812, 832) is also provided a timestamp using the timestamp circuitry of the MCT. Each MCT is provided a 10-bit timebase timestamp ("TS") to a TS replicator (820, 840). The TS replicator provides the 10-bit timebase timestamp to 4 different TS decoder. The TS decoders decodes the timestamp information into a 64-bit timestamp that is in turn provided to each of the cluster_debug 0, 1, 2, and 3 components (812, 832) respectively. The timestamp components generate and distribute consistent timestamp values to multiple destinations the multi-core processing system, according to some embodiments. The 10-bit timestamp components can be used to distribute narrow timestamps around the SoC in some embodiments. The narrow timestamp interconnect provides a mechanism for efficiently distributing 10-bit timestamp values across a potentially large system in a cost-effective way. It has the following features: full 64-bit timestamp values are distributed using a 10-bit interface that cases system wire routing; a decoded timestamp value is presented as a natural binary number to software, and decoded timestamp value of zero indicates an unknown timestamp, for example when resynchronizing.

Each cluster_debug 0, 1, 2, and 3 component (812, 832) also provides a trace bus ("TB") that can be used to provide an instruction trace or a data trace for a particular core or core cluster (814, 834). Each cluster_debug component can contain a hardware macrocell that, when connected to a core, outputs trace information on a trace port. The cluster_debug provides core-driven trace through a trace port. A cluster_debug component can support instruction trace, in some embodiments, and might support data trace as well, in some embodiments. The trace bus for each cluster_debug 0, 1, 2, and 3 component (812, 832) is input into a synchronous bridge (810, 830) before being input into a funnel (808, 828). The funnel (808, 828) acts as a kind of multiplexor that selects the appropriate trace bus from the appropriate cluster_debug component (812, 832) or the trace bus from the MCT placed below (South) of the current MCT. The output of the funnel is provided to another synchronous bridge (850) before being input into a FIFO (848) and output as the trace bus to external components. This circuitry that receives the output of the funnel can be part of the SI (802), in some embodiments, or can be separate circuitry (854) as depicted in FIG. 8. The processor cores within the isolated partition to be traced without affecting any operation of any other processor core of any other isolated partition.

Furthermore, some embodiments provide simultaneous profiling support for multiple virtual applications per partition. For example, there can be 4 virtual applications per partition. In some preferred embodiments, virtual applications are intended to run to completion, with no application preemption. In some of these embodiments, there is no context switching. In these embodiments, debug does not change the virtual application in progress, but simply allows for debug of it. In these embodiments, when breaking an application, the processor is halted. In other embodiments, however, the context management and global configuration component (414) of the SI (400) of FIG. 4 can communicate with one or more of the four different virtual configuration and status components (416) to context switch between multiple applications, saving and restoring them from the context storage. The context management unit (414) may execute a context switch upon a request from dedicated scheduling hardware, a software request, or a halt command from a debug support unit or the processor itself. Halt requests may make the context unit suspend the execution of the running application and save its context into the context storage, as it does in an application preemption operation. However, in some of these embodiments, the halted application may only be put back into normal execution upon a request from a debug unit. This halting process may be performed with multiple applications, so that a plurality of them can be halted in a given time. The applications in halt state may have their contexts accessed by a debug unit through the arbitration of the context unit. In these embodiments, the processor cores can continue executing code from other applications not halted, context switches being performed as usual.

Each MCT also includes a cross-trigger matrix ("CTM") (822, 842) that can provide trigger support for the isolated partitions. The CTM (822, 842) communicates with a cross-trigger interface ("CTI") (852) of circuitry 854. A CTM combines the trigger requests generated by one or more CTIs and broadcasts them to all CTIs as channel triggers. A CTI provides the interface between a processor and the CTM. A channel-in and a channel-out signal is routed from the CTM to each of the cluster_debug 0, 1, 2, and 3 components (812, 832). Each of the cluster_debug 0, 1, 2, and 3 components (812, 832) can include its own CTI, which acts as an interface between the CTM (822, 842) and the respective core_cluster 0, 1, 2, or 3 (814, 834) that is associated with respective cluster_debug component. A core_cluster (814, 834) can receive a trigger via a channel-in signal from the CTM (822, 842) that is routed through its associated cluster_debug (812, 832) component, where the associated cluster_debug (812, 832) component can include its own CTI (which acts as an interface between the CTM (822, 842) and the respective core_cluster (814, 834)). In addition, in some embodiments, a core of a core_cluster (814, 834) can also trigger other cores via a channel-out signal that is routed through its associated cluster_debug (812, 832) component (and potentially a CTI of the cluster_debug component) to the CTM (822, 842). In some embodiments, the CTM (822, 842) may also receive inputs from an external development tool, or from another component of the system. In some of these embodiments, the CTM (822, 842) can generate outputs to the external development tool as well.

This cross-triggering circuitry can run or stop or step cores in a partition. The cross-triggering circuitry can also provide an isolated debug capability per partition through the trigger routing service. This can provide cross-triggering capability at a partition level for run control (where a partition can include either single or multiple quartiles). For example, a SI can be configured to allow all processor cores within the isolated partition to be at least one of: halted, single-stepped, or interrogated, without affecting any operation of any other processor core of any other isolated partition. A trigger can allow the starting and stopping of trace bus tracing for a particular partition and a particular virtual application executing on the partition.

Since each MCT includes a CTM (822, 842), the plurality of MCTs of a multi-core processing system necessarily includes a plurality of CTMs. The SI (802 of FIG. 8, 400 of FIG. 4) can be configured to control at least one of the plurality of CTMs to enable or disable at least a portion of the debug network to allow an isolated partition to be debugged independently of another isolated partition. In some embodiments, the SI is configured to control another one or more of the plurality of CTMs to enable or disable at least another portion of the debug network to allow a reconfigured isolated partition to be debugged independently of another reconfigured isolated partition. In some embodiments, the SI can be configured to control the plurality of CTMs at run-time. In some embodiments, the SI can be configured to control the plurality of CTMs in response to an indication that the isolated partitions have been reconfigured. In some embodiments, the isolated partition control circuitry (424) of the SI performs this functionality.

All the CTMs of the plurality of MCTs can establish a debug network among the MCTs. The CTMs (822, 842) of the respective MCTs (824, 844) can be connected to the East or West (right-side or left-side) place MCTs, when those MCTs are part of the same partition. If those MCTs are not part of the same partition, then the CTM (822, 842) is disconnected from the CTMs of those partitions. In FIG. 8 there are 2 MCTs per quartile. Therefore, the CTMs (822, 842) of the two MCTs (824, 844) can be connected together. If there were more MCTs to the South (bottom-side) of MCT 844, then the CTMs of those MCTs could also be connected to CTM 842. A CTM can be connected to CTMs of its same isolated partition, and disconnected from CTMs of other isolated partitions by the same isolated partition control circuit that controls the one or more mesh routers to enable bus connections and disable other bus connections to create the isolated partitions. In some embodiments, the SI is configured to designate the portion of the debug network segment as inactive, at least in part, in response to different MCTs belonging to different quartiles being assigned to a same isolated partition. In some embodiments, the SI is configured to select the portion of the debug network based, at least in part, upon a configuration of the isolated partitions of processor cores.

As such, systems and methods for dynamically creating multiple isolated partitions in a multi-core processing system, and debugging multi-core processors with configurable isolated partitions have been described. In an illustrative, non-limiting embodiment, an integrated circuit, may include: a plurality of Cross-Trigger Matrices (CTMs) configured to establish a debug network among a plurality of multi-cluster tiles (MCTs), where each MCT includes a plurality of processor cores, and where each processor core is assigned to a respective isolated partition of processor cores; and a System Interface (SI) coupled to the plurality of CTMs, where the SI is configured to control at least one of the plurality of CTMs to enable or disable at least a portion of the debug network to allow an isolated partition to be debugged independently of another isolated partition.

In some embodiments, the SI is configured to allow all processor cores within the isolated partition to be at least one of: halted, single-stepped, or interrogated, without affecting any operation of any other processor core of any other isolated partition. In some embodiments, the SI is configured to allow any processor cores within the isolated partition to receive a debug command without affecting any operation of any other processor core of any other isolated partition. In some embodiments, the debug command includes at least one of: a break, a step, or a register dump command.

In some embodiments, the SI is configured to allow the processor cores within an MCT to be traced, and for all tracing to be handled within an MCT. In other embodiments, the SI is configured to allow all processor cores within the isolated partition to be traced without affecting any operation of any other processor core of any other isolated partition. In some embodiments, each isolated partition comprises a configuration of either 16, 32, 64, 128, or 256 processor cores of the plurality of processor cores, and the SI is configured to allow any individual processor core within any individual isolated partition to be traced without regard to the configuration of the individual isolated partition. In some embodiments, the SI is also configured to allow all processor cores within the isolated partition to be profiled without affecting any operation of any other processor core of any other isolated partition. In some embodiments, each isolated partition comprises a configuration of either 16, 32, 64, 128, or 256 processor cores of the plurality of processor cores, each isolated partition executes a plurality of virtual applications on its respective processor cores, and the SI is configured to allow each of the virtual applications to be monitored for performance without regard to the configuration of the respective isolated partition.

In some embodiments, the SI is configured to designate the portion of the debug network segment as inactive, at least in part, in response to different MCTs belonging to different quartiles being assigned to a same isolated partition. In some embodiments, the SI is configured to select the portion of the debug network based, at least in part, upon a configuration of the isolated partitions of processor cores. In some embodiments, the SI is configured to control the plurality of CTMs at run-time.

In some embodiments, the SI is configured to control the plurality of CTMs in response to an indication that the isolated partitions have been reconfigured. In some embodiments, the SI is configured to control another one or more of the plurality of CTMs to enable or disable at least another portion of the debug network to allow a reconfigured isolated partition to be debugged independently of another reconfigured isolated partition. In some embodiments, at least a given one of the plurality of isolated partitions enables a debugging of applications executed on processor cores of the given isolated partition. In some embodiments, the applications include virtual applications.

In another illustrative, non-limiting embodiment, an method, may include: receiving, at a System Interface (SI) of a hardware accelerator having a plurality of multi-cluster tiles (MCTs), where each MCT includes a plurality of processor cores, an indication of configuration of a plurality of isolated partitions of processor cores; and enabling or disabling, by the SI, one or more buses between two or more of the plurality of MCTs to create a plurality of isolated debug networks, each isolated debug network corresponding to a distinct isolated partition of processor cores.

In some embodiments, the indication is received at run-time. In some embodiments, the one or more buses include a router bus, a message bus, and a broadcast bus. In some embodiments, the enabling or disabling the one or more buses further includes controlling, by the SI, at least one of a plurality of Cross-Trigger Matrices (CTMs) coupled between the two or more of the plurality of MCTs.

In another illustrative, non-limiting embodiment, a hardware accelerator, may include: an isolated partition control circuit coupled to a plurality of processor cores within multi-cluster tiles (MCTs), the isolated partition control circuit configured to dynamically partition the plurality of processor cores into a plurality of isolated partitions to prevent an application executed on one more processor cores of a first isolated partition from corrupting or interfering with another application executed on a different one or more processor cores of a second isolated partition; and a System Interface (SI) configured to enable or disable one or more buses between two or more of the plurality of MCTs to create a plurality of isolated debug networks, each isolated debug network corresponding to a distinct isolated partition.

In some embodiments, the hardware accelerator further includes a plurality of mesh routers coupled to the isolated partition control circuit. In some embodiments, the isolated partition control circuit is configured to use at least one of the plurality of mesh routers to enable or disable one or more other buses to dynamically partition the plurality of processor cores. In some embodiments, the one or more other buses include at least one of: a router bus, a message bus, or a broadcast bus In various embodiments, systems and methods described herein may provide for dynamically creating multiple isolated partitions in a multi-core processing system, and debugging multi-core processors with configurable isolated partitions, in a System-On-a-Chip (SoC), Field-Programmable Gate Array (FPGA), Application-Specific Integrated Circuit (ASIC), or any other suitable data processing system including a plurality of discrete circuits or semiconductor Intellectual Property (IP) cores (collectively referred to as "SoC devices" or simply "devices") disposed in a single electronic or semiconductor package.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow. It is intended that the following claims be interpreted to embrace all such modifications and changes and, accordingly, the above description to be regarded in an illustrative rather than a restrictive sense.

The previous detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

For sake of brevity, conventional techniques related to signal processing, sampling, sensing, analog-to-digital conversion, computer architecture, and PWM, have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although the invention(s) are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined circuits or logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An integrated circuit, comprising:
a plurality of multi-cluster tiles (MCTs), wherein each MCT is allocated to one of four quartiles and each MCT comprises:
a plurality of processor cores, wherein each processor core is assigned to a respective isolated partition of processor cores, from a plurality of isolated partitions; and
a cross-trigger matrix (CTM) communicatively coupled to the respective plurality of processor cores to transmit a trigger request to a particular isolated partition from the plurality of isolated partitions;
wherein, collectively, the CTMs from each MCT establish a debug network;
a System Interface (SI) coupled to each CTM, wherein the SI is configured to:
determine that a first MCT of the plurality of MCTs is in a first quartile of the four quartiles and includes a first set of processor cores in a first isolated partition out of the plurality of isolated partitions,
determine that a second MCT of the plurality of MCTs is in a second quartile of the four quartiles and includes a second set of processor cores in the first isolated partition out of the plurality of isolated partitions, and
control a first CTM of the first MCT and a second CTM of the second MCT to disable a portion of the debug network associated with the first isolated partition to allow an isolated partition to be debugged independently of another isolated partition.

2. The integrated circuit of claim 1, wherein the SI is configured to allow all processor cores within the respective isolated partition to be at least one of: halted, single-stepped, or interrogated, without affecting any operation of any other processor core of any other isolated partition.

3. The integrated circuit of claim 1, wherein the SI is configured to allow any processor cores within the respective isolated partition to receive a debug command without affecting any operation of any other processor core of any other isolated partition.

4. The integrated circuit of claim 3, wherein the debug command comprises at least one of: a break, a step, or a register dump command.

5. The integrated circuit of claim 1, wherein each isolated partition comprises a configuration of either 16, 32, 64, 128, or 256 processor cores of the plurality of processor cores, and wherein the SI is configured to allow any individual processor core within any individual isolated partition to be traced without regard to the configuration of the individual isolated partition.

6. The integrated circuit of claim 1, wherein each isolated partition comprises a configuration of either 16, 32, 64, 128, or 256 processor cores of the plurality of processor cores, wherein each isolated partition executes a plurality of virtual applications on its respective processor cores, and wherein the SI is configured to allow each of the virtual applications to be monitored for performance without regard to the configuration of the respective isolated partition.

7. The integrated circuit of claim 1, wherein the SI is configured to select the portion of the debug network based, at least in part, upon a configuration of the isolated partitions of processor cores.

8. The integrated circuit of claim 1, wherein the SI is configured to enable or disable the portion of the debug network at run-time.

9. The integrated circuit of claim 1, wherein the SI is configured to control the plurality of CTMs in response to an indication that the isolated partitions have been reconfigured.

10. The integrated circuit of claim 9, wherein the SI is configured to control another one or more of the plurality of CTMs to enable or disable at least another portion of the debug network to allow a reconfigured isolated partition to be debugged independently of another reconfigured isolated partition.

11. The integrated circuit of claim 1, wherein at least a given one of the plurality of isolated partitions enables a debugging of applications executed on processor cores of the given isolated partition.

12. The integrated circuit of claim 11, wherein the applications comprise virtual applications.

13. A method, comprising:

receiving, at a System Interface (SI) of a hardware accelerator having a plurality of multi-cluster tiles (MCTs), wherein each MCT is allocated to one of four quartiles and comprises a plurality of processor cores and a dedicated cross-trigger matrix (CTM) communicatively coupled to the respective plurality of processor cores, an indication of configuration of a plurality of isolated partitions of processor cores;

determining, by the SI, that a first MCT of the plurality of MCTs is in a first quartile of the four quartiles and includes a first set of processor cores in a first isolated partition out of the plurality of isolated partitions;

determining, by the SI, that a second MCT of the plurality of MCTs is in a second quartile of the four quartiles and includes a second set of processor cores in the first isolated partition out of the plurality of isolated partitions; and controlling a first CTM of the first MCT and a second CTM of the second MCT to disable a portion of a debug network associated with the first isolated partition by disabling, by the SI, one or more buses between two or more of the plurality of MCTs via the dedicated cross-trigger matrix to create a plurality of isolated debug networks, each isolated debug network corresponding to a distinct isolated partition of processor cores.

14. The method of claim 13, wherein the indication is received at run-time.

15. The method of claim 13, wherein the one or more buses include a router bus, a message bus, and a broadcast bus.

16. The method of claim 13, wherein enabling or disabling the one or more buses further comprises transmitting a signal, by the SI, to the dedicated CTM.

17. A hardware accelerator, comprising:

an isolated partition control circuit coupled to a plurality of processor cores within multi-cluster tiles (MCTs), wherein each MCT is allocated to one set of a plurality of MCT sets, the isolated partition control circuit configured to dynamically partition the plurality of processor cores into a plurality of isolated partitions to prevent an application executed on one more processor cores of a first isolated partition from corrupting or interfering with another application executed on a different one or more processor cores of a second isolated partition; and a System Interface (SI) configured to:

determine that a first MCT of the plurality of MCTs is in a first set of the plurality of sets and is associated with a first set of processor cores in a first isolated partition out of the plurality of isolated partitions, determine that a second MCT of the plurality of MCTs is in a second set of the plurality of sets and includes a second set of processor cores in the first isolated partition out of the plurality of isolated partitions, and control a first CTM of the first MCT and a second CTM of the second MCT to disable one or more buses between two or more of the plurality of MCTs to create a plurality of isolated debug networks wherein a portion of the plurality of isolated debug networks associated the first isolated portion is disabled, each isolated debug network corresponding to a distinct isolated partition.

18. The hardware accelerator of claim 17, further comprising a plurality of mesh routers coupled to the isolated partition control circuit, wherein the isolated partition control circuit is configured to use at least one of the plurality of mesh routers to enable or disable one or more other buses to dynamically partition the plurality of processor cores.

19. The hardware accelerator of claim 18, wherein the one or more other buses comprise at least one of: a router bus, a message bus, or a broadcast bus.

* * * * *